(12) United States Patent
Gray

(10) Patent No.: US 10,517,323 B1
(45) Date of Patent: *Dec. 31, 2019

(54) METHOD OF FORMING A WOVEN FOOD CONDIMENT

(71) Applicant: Robin Scott Gray, Ellicott City, MD (US)

(72) Inventor: Robin Scott Gray, Ellicott City, MD (US)

( * ) Notice: Subject to any disclaimer, the term of this patent is extended or adjusted under 35 U.S.C. 154(b) by 83 days.

This patent is subject to a terminal disclaimer.

(21) Appl. No.: 15/731,235

(22) Filed: May 8, 2017

Related U.S. Application Data

(62) Division of application No. 14/544,408, filed on Jan. 2, 2015, now Pat. No. 9,681,680, which is a division of application No. 12/319,165, filed on Jan. 3, 2009, now Pat. No. 8,962,061, which is a division of application No. 10/822,257, filed on Apr. 10, 2004, now Pat. No. 7,501,144, which is a division of application No. 09/911,045, filed on Jul. 23, 2001, now Pat. No. 6,759,069.

(51) Int. Cl.
*A23L 27/00* (2016.01)
*A23P 10/30* (2016.01)

(52) U.S. Cl.
CPC .............. *A23P 10/30* (2016.08); *A23L 27/00* (2016.08)

(58) Field of Classification Search
CPC .................................. A23P 30/10; A23L 27/00
USPC .......... 426/512, 518; 99/450.1, 0.2, 0.4, 537
See application file for complete search history.

(56) References Cited

U.S. PATENT DOCUMENTS

| 1,950,772 | A | 3/1934 | Biggs |
| 2,153,351 | A | 4/1939 | Steinberger |
| 2,698,273 | A | 12/1954 | Miner |
| 3,119,728 | A | 1/1964 | Janapol |
| 3,386,503 | A | 6/1968 | Corning |
| 3,615,597 | A | 10/1971 | Durst |
| 3,772,038 | A | 11/1973 | Ayres et al. |

(Continued)

FOREIGN PATENT DOCUMENTS

| WO | WO-8702550 A1 * | 5/1987 | ............. A23L 17/70 |
| WO | WO 02/01972 | 1/2002 | |

OTHER PUBLICATIONS

"Weave" Thesaurus.com p. 1 printed Jul. 2019 https://www.thesaurus.com/browse/weave (Year: 2019).*

(Continued)

*Primary Examiner* — Kelly J Bekker
(74) *Attorney, Agent, or Firm* — Robin S. Gray

(57) ABSTRACT

A food condiment slice, method of using, composition and method for making, and methods for manufacturing are described. The food condiment slices are used with sandwiches, other food products, and beverages. The food condiment slices may have different structures such as face-fused, side-fused, face-fused-side-fused, woven, and chopped. The food condiment slices are formed from condiments such as catsup, ketchup, mustard, mayonnaise, barbecue sauce, steak sauce, jellies, jam, preserves, butter, margarine, marinades, creamers, and syrups. More than one food condiment can be integrated into a single food condiment slice. The food condiment slices eliminate the need and inconvenience of using and carrying spreadable, squeezable, and pourable food condiments. Also included are beverage condiment slices or discs such as coffee or tea dairy and non-dairy creamers.

9 Claims, 26 Drawing Sheets

(56) References Cited

U.S. PATENT DOCUMENTS

| | | | |
|---|---|---|---|
| 3,848,757 A | 11/1974 | Jordan | |
| 3,966,993 A | 6/1976 | Luck | |
| 3,985,913 A | 10/1976 | Johnson et al. | |
| 4,068,007 A | 1/1978 | Forkner | |
| 4,177,100 A | 12/1979 | Pennington | |
| 4,356,052 A | 10/1982 | Moraw | |
| 4,438,686 A | 3/1984 | Perez | |
| 4,618,498 A * | 10/1986 | Thulin | A23P 20/20 426/275 |
| 5,036,756 A | 8/1991 | Lindee | |
| 5,112,632 A | 5/1992 | Meli et al. | |
| 5,114,307 A | 5/1992 | Meli et al. | |
| 5,256,432 A | 10/1993 | McDonald et al. | |
| 5,266,150 A | 11/1993 | Miller | |
| 5,312,641 A | 5/1994 | Castillo, Jr. | |
| 5,347,792 A | 9/1994 | Meli et al. | |
| 5,440,860 A | 8/1995 | Meli et al. | |
| 5,525,362 A | 6/1996 | Rebstock et al. | |
| 5,567,454 A | 10/1996 | Bogdan | |
| 5,701,724 A | 12/1997 | Meli et al. | |
| 5,853,778 A | 12/1998 | Mayfield | |
| 5,855,939 A | 1/1999 | Bogdan | |
| 5,858,426 A | 1/1999 | Bienvenu | |
| 5,894,028 A | 4/1999 | Alden et al. | |
| 5,928,692 A | 7/1999 | Mayfield | |
| 6,058,680 A | 5/2000 | Meli et al. | |
| RE37,275 E | 7/2001 | Bogdan | |
| 6,391,358 B2 | 5/2002 | Finnie et al. | |
| 6,395,321 B1 | 5/2002 | Shaft et al. | |
| 6,616,958 B1 | 9/2003 | Stewart | |
| 7,060,311 B1 | 6/2006 | Milani et al. | |

OTHER PUBLICATIONS

"Cut" Dictionary.com p. 1 printed Jul. 2019 https://www.dictionary.com/browse/cut (Year: 2019).*

"Knit" Dictionary.com pp. 1-5 printed Jul. 2019 https://www.dictionary.com/browse/knit?s=t (Year: 2019).*

* cited by examiner

METHOD OF FORMING A WOVEN FOOD CONDIMENT

This application is a Divisional of U.S. application Ser. No. 14/544,408, filed on Jan. 2, 2015, U.S. Pat. No. 9,681,680; which is a Divisional Application of U.S. application Ser. No. 12/319,165, filed on Jan. 3, 2009, U.S. Pat. No. 8,962,061; which is a Divisional Application of U.S. application Ser. No. 10/822,257, filed on Apr. 10, 2004, U.S. Pat. No. 7,501,144; which is a Divisional Application of U.S. application Ser. No. 09/911,045, filed on Jul. 23, 2001, U.S. Pat. No. 6,759,069.

BACKGROUND OF THE INVENTION

Different types of spreadable, squeezable, and pourable food condiments are known for use in preparing cold-cut sandwiches, hamburgers, hotdogs, bagels, pitas, English muffins, muffins, fish sandwiches, tortillas, crackers, croissants, cold cuts, noodles, and many other types of sandwiches or food products. Such spreadable, squeezable, and pourable food condiments include catsup, ketchup, mustard, mayonnaise, barbeque sauce, steak sauce, tartar sauce, peanut butter, jellies, jams, preserves, cheeses, cheese spreads, butter, honey butter and other flavored butters, margarine, marinades, creamers, syrups, spaghetti sauces, gravy sauces, teriyaki sauce, soy sauce, glazes, salad dressings, or any other types of spreads, or food dressings. When making sandwiches using the squeezable, pourable, or spreadable condiments as mentioned, the spreadable, squeezable, and pourable condiments which are distributed onto or in sandwiches are often absorbed into the sandwich bread causing the bread to loose its texture, forming a sloppy, soggy, and doughy result. The taste of the bread also suffers. Because of the absorption of the condiments into the bread and the bread becoming soggy and mushy, the sandwich bread often falls and/or tears apart during handling. Also, individuals using the spreadable, squeezable, and pourable condiments oftentimes must contend with the condiment leaking or dripping from the food item during eating. In addition, outdoor activities, such as camping, picnics, and vacations in which food is packed and carried generally includes the packing of condiments such as those recited above. The packing and carrying of the condiments often requires use of a cooler with ice to maintain the temperature of the cooler at a temperature which will insure that freshness of the condiments and other items is maintained. A drawback of packing the bottles and jars of condiments in the cooler is the space taken up in the cooler by the bulky bottles and jars used in packaging the condiments. Smaller versions of bottles and jars used to package condiments have been introduced. However, these smaller versions do not overcome the problems noted above because several types and shapes of jars and bottles must be packed and carried. The present invention overcomes the drawbacks noted above.

SUMMARY OF THE INVENTION

This invention relates to new and improved forms for condiments which are applied to sandwiches, hamburgers, hotdogs, bagels, pitas, English muffins, muffins, fish sandwiches, tortillas, crackers, croissants, cold cuts, and any other types of sandwiches or other food products. The food condiment of the instant invention is provided for sale in plastic or cellophane packages containing a plurality of stacked individually wrapped hermetically sealed, sandwich-sized, single-serve slices. Alternative packaging for the sandwich-sized, single-serve, slices of food condiment involves providing a plurality of face-to-face stacked food condiment slices with each slice separated from the other using paper separator sheets on the face surfaces of each of the food condiment slices. These paper separated food condiment slices may then be further wrapped and packaged in a box or wrapped in cellophane or other desired materials, as an outer packaging material. The packages containing a plurality of food condiment slices can be sold in grocery stores, super markets, and convenience stores to the general public. Also, other establishments, such as delicatessens, convenience stores, sandwich shops, and restaurants may also use the food condiment articles of the instant invention to prepare sandwiches for sale. The form, shape, and consistency of the food condiment article of the instant invention allows the sandwich to be prepared at a time in advance of the sale because the individually sliced food condiments of the instant invention will not affect the texture of the bread used to make the sandwich when the sandwich is stored for an extended period of time.

When preparing a food item, for example, using the individually wrapped sandwich-sized, single-serve slices of food condiment of the instant invention, the individual wrapping is first removed from the food condiment by opening the wrapping and removing the sandwich-sized, single-serve, slice of food condiment. The sandwiched-sized, single-serve, sliced food condiment is then placed on a sandwich, bagel, pita, English muffin, muffin, fish sandwich, tortilla, cracker, croissant, cold cuts, or any other types of sandwiches or food items, without the requirement and inconvenience of spreading, pouring, or squeezing the food condiments onto the food item. The consistency of the sandwich-sized, single-serve, sliced food condiment produced by the instant invention is flexible or limber, has a smooth texture, has a non-sticky feel, and retains the definite sandwich-sized shape or other shape provided to it by the manufacturing process during handling. That is, it can be removed from the hermetically sealed protective wrapping, picked up and handed with fingers, and used in preparing a food item by transferring it whole to the food item being prepared without destroying or breaking-apart the single-serve food condiment slice. The food condiment formed and used in the instant invention is intended to melt or soften when exposed to heat. Thus, individuals using the instant invention would not have to contend with the dripping of the food condiment from the food item during eating, as is often the case when using the spreadable, pourable, or squeezable condiment forms.

As a specific example, an individual preparing a sandwich desiring mayonnaise would remove an individually wrapped, hermetically sealed, sliced food condiment of mayonnaise from a hermetically sealed wrapper, and place the sliced mayonnaise food condiment on a first slice of sandwich bread used in preparing the sandwich. The sliced mayonnaise food condiment can be placed on the slice of sandwich bread in contact with the bread without causing the bread to become soggy. That is, the bread does not appreciably or substantially absorb moisture from the sliced mayonnaise food condiment which would cause the bread to loose its texture and become weakened due to sogginess or mushiness. The individual preparing the sandwich can prepare the sandwich at a time in advance of consumption without the worry of the sandwich becoming soggy or mushy during its storage.

An additional advantage of the sliced food condiments of the instant invention includes elimination of the tedious burden of packing and carrying bulky bottles and jars on outings, such as picnics, barbeques, and vacations. Individuals using the instant invention would carry the desired food condiments in the form of sandwich-sized, single-serve, hermetically sealed, individually wrapped slices. A plurality of these individually wrapped, hermetically sealed, sandwich-sized, single-serve food condiment slices may be further packaged in cellophane or plastic. Such packaging containing the plurality of sandwich-sized, single-serve, hermetically sealed, individually wrapped food condiments is easily stored in a cooler without taking up a significant amount of cooler space. Also, use of the sandwich-sized, single-serve, food condiment forms of the instant invention provides for easy use of food condiments without the messy clean-up required when using spreadable, squeezable, or pourable condiments.

An additional use for the food condiments of the instant invention is barbeques, wherein a sheet layer barbeque sauce food condiment of the instant invention can be placed over the food being cooked, as in an oven, or on a grill. The food being cooked or grilled may also be wrapped in a sheet of barbeque sauce food condiment. When the food wrapped in the food condiment, or when a food condiment having the condiment thereon, is placed on the grill or in an oven, the sheet layered barbeque sauce food condiment melts and coats the food as it cooks. There is no longer a need to apply pourable, squeezable, or spreadable barbeque sauce on the food being cooked or grilled, although additional and different condiment slices can be added to the cooking food.

A first embodiment of the instant invention provides a sandwich-sized, single-serve, food condiment slice. The sandwich-sized, single-serve, food condiment slice can be a condiment such as catsup, ketchup, mustard, mayonnaise, barbeque sauce, steak sauce, tartar sauce, peanut butter, jellies, jams, preserves, cheeses, cheese spreads, butter, margarine, creamers, syrups, spaghetti sauces, gravy sauces, teriyaki sauce, soy sauce, glazes, salad dressings, or any other types of spreads or food dressings. The sandwich-sized, single-serve, food condiment slice, is individually wrapped with a hermetically sealed protective wrapping. A plurality of the individually wrapped, hermetically sealed, sandwich-sized, single-serve, food condiment slices can further be packaged for sale. While all of the food condiment and beverage condiment slices or discs of the instant invention can be of any desired shape and size and thickness necessary for the intended purpose, discussion of the embodiments will refer to only sandwich-sized slices.

The manufacturing process used to produce the food condiment products of the instant embodiment can involve forming the condiments into a large sheet formed condiment and dividing the large sheet formed condiment into individual sandwich-sized, single-serve, slices of food condiment, and then individually wrapping the individual sandwich-sized, single-serve, slices of food condiment in a hermetically sealed protective plastic, thermoplastic, or cellophane single-serve wrapping. A plurality of the hermetically sealed, individually wrapped, single-serve, sandwich-sized, food condiment slices can then be further packaged for sale.

The food condiment is formed into a sheet by a process such as extrusion molding, thin film molding, injection molding, compression molding, or any other process or combination of processes which will accomplish the objective of forming sheet-formed food condiments. The size of the food condiment sheets being manufactured may vary depending on such factors as, among others, subsequent operating or process steps, capacity of machinery, and type of process used. The food condiment sheets may have any desired thickness. As an example, the thickness of the condiment sheets, and the resulting individual food condiment slices, can be determined by the average amount or average volume of a particular food condiment generally added to a sandwich or other food item for consumption. The formed food condiment sheets are subsequently divided by a cutting operation into sandwich-sized, single-serve, food condiment slices. The cutting operation uses a cutting tool which has heated cutting blades or non-heated cutting blades, which provides a smooth cut. The final product of the manufacturing process is a sandwich-sized, single-serve, slice of a food condiment, having a desired thickness, which is hermetically sealed in an individual wrapping. A plurality of the hermetically sealed individually wrapped sandwiched-sized, single-serve, food condiment slices can be further packaged in a labeled, protective plastic, thermoplastic, or cellophane wrapping for shipping, dispensing and sale.

The manufacturing process may also produce the sandwich-sized, single-serve, slices of food condiment individually. Sandwich-sized, single-serve, food condiment slices can be formed directly by a manufacturing process that does not require formation of large condiment sheets followed by its subsequent division. This manufacturing process can include molding processes such as extrusion molding, pouring, injection molding, or any other molding process, or combination of processes, that will accomplish the objective of transferring the food condiment into or onto molding surfaces having the desired final shape. Following the molding process, the molded sandwich-sized, food condiment slices are removed from the molds followed by the step of individually wrapping, using a hermetic seal, each single-serve, sandwich-sized, food condiment slice. A plurality of the hermetically sealed, individually wrapped, single-serve, sandwich-sized, food condiment slices may be further packaged for sale, as indicated previously. The alternative also exists here for using separator sheets between each individually manufactured slice of food condiment in a stack such that one face surface of two individual food condiment slices would share opposite faces of a separator sheet.

A second embodiment of the instant invention is to provide a sandwich-sized, singe-serve, combination food condiment slices comprising at least two food condiments face-fused together to form a sandwich-sized, single-serve, face-fused combination food condiment slice. The sandwich-sized, single-serve, face-fused combination food condiment slices are individually wrapped with a hermetically sealed protective wrapping. A plurality of the individually wrapped, hermetically sealed, sandwich-sized, single-serve, face-fused combination food condiment slices can be further packaged for sale. The structure of the individual slices of the sandwich-sized, single-serve, face-fused combination food condiment slices each has an outer face surface and an inner face surface. The two inner face surfaces are fused to each other forming a sandwich-sized, single-serve, face-fused, combination food condiment slice. The first outer face surface of the face-fused combination food condiment slice is comprised of a first food condiment. The second outer face surface is comprised of a second food condiment. It is noted that the first food condiment and the second food condiment can be the same. Again, the first food condiment and the second food condiment, of the face-fused combination food condiment slice, are fused together at their inner face surfaces. Fusion of the inner face surfaces of the first and second food condiment slices forms the sandwich-sized, single-serve, face-fused combination food condiment slice. The fused combination food condiment slice has a first face side comprising the first food condiment and a second face side comprising the second food condiment. As noted previously, the first food condiment can be the same food condiment as the second food condiment. The fused combination food condiment slice may also have additional food condiment slices added to the fused combination food condiment structure, if so desired. A resulting food condiment structure comprising three single food condiment slices would have one of the three single food condiment slices sandwiched between and fused to the inner face surfaces of the outer two food condiment slices.

Formation of the fused combination food condiment slices can be accomplished by different methods. A first method describes steps for making a fused combination food condiment slice having two different food condiments. Initially, each of the two separate food condiment sheets, which can be formed by the molding methods previously disclosed in the first embodiment of the instant invention and hereby incorporated in this discussion, is heated on one of its surfaces to the flow point of the food condiment. The heated surfaces of the two separate food condiment sheets are then mated or contacted together such that the heated and mated surfaces bond together to form a fused combination food condiment sheet. The first food condiment sheet forms one outer face surface of the fused combination food condiment sheet and the second food condiment sheet forms the opposite outer face surface of the fused combination food condiment sheet. The fused combination food condiment sheet is then processed through a cutting step in which the fused combination food condiment sheet is divided, by cutting, into separate sandwich-sized, single-serve, fused combination food condiment slices.

As an alternative method to fusing the food condiment sheet together, an edible bonding layer may be sandwiched between the first food condiment sheet and the second food condiment sheet to join the two food condiment sheets together. In this alternative bonding method, the edible bonding layer can be preheated on both sides to its flow temperature and mated or contacted to the two food condiment sheets in separate steps. One of the two preheated face surfaces of the edible bonding sheet is mated and bonded with an inner face surface of the first food condiment sheet. Then, the other preheated face surface of the edible bonding sheet is then mated and bonded to an inner face surface of the second food condiment sheet. It is noted that because both face surfaces of the edible bonding sheet have been preheated to the flow point of the edible bonding sheet, the mating and bonding steps may alternatively occur simultaneously, wherein both food condiment sheets are mated and bonded to the edible bonding sheet in a single step, rather than mating and attaching one and then mating and attaching the other in separate steps. As a further alternative, one face surface of the edible bonding sheet can be preheated to the flow point temperature of the edible bonding material and then mated with a face surface of an inner first food condiment sheet. Following this bonding step, the second face surface of the edible bonding sheet is preheated to the flow point temperature of the edible bonding sheet and mated with an inner face surface of the second food condiment sheet. The resulting fused combination food condiment sheet which results from any of the above mating and bonding processes is then processed through a cutting step in which the fused combination food condiment sheet is divided, by cutting, into separate sandwich-sized, single-serve, fused combination food condiment slices. The cutting device used to perform the cutting step may optionally have a surface used for compression and optionally the compression surface may be heated to a temperature which will allow at least one of the first food condiment or the second food condiment to flow. The compression surface allows, although not required, a decorative design, crimping, or border to be embossed into the periphery or other desired area of the fused combination food condiment slice during the cutting step. It may also provide or form a raised border to the sandwich-sized, single-serve, fused combination food condiment slice. The cutting device may optionally be heated to the flow point temperature of the first food condiment or the second food condiment during the cutting step to provide smooth cut edges to the sandwich-sized, single-serve, fused combination food condiment slices. Also, rather than heating the edible bonding material, the food condiment sheets can be heated to their flow points such that they are softened at their surface and then bonded to the edible bonding sheet. Alternatively, all sheets can be heated at their surfaces for bonding.

A further alternative of the second embodiment is to bond by fusion a first food condiment slice to a second food condiment slice by performing the fusion in an area of the face-to-face food condiment slices other than the peripheral edges. This process involves heating an area of the inner face of at least one of the food condiment slices to its flow point and is contacted with the inner face surface of the second food condiment slice.

An additional method for fusing two separate food condiment sheets involves the steps of mating a face surface of a first food condiment sheet with a face surface of a second food condiment sheet that has been positioned on a work surface. Next, the mating edge portions of the two mating face-to-face food condiment sheets are restrained by friction between the two mating surfaces of the condiment sheets, or by holding devices, clamps, or any other desired means, at the edge portions of the mating condiment sheets, if necessary, such that the opposing food condiment sheets do not substantially shift or move from their face-to-face relationship. Next, at least one compression/heating/cutting device is contacted with the outer face surface of the upper food condiment sheet. The compression/heating/cutting device is heated at its peripheral edge molding or reshaping surface and its cutting surface to the flow temperature of the first food condiment or the second food condiment. The compression/heating/cutting device is contacted to the outer surface of the upper exposed food condiment sheet. The compression/heating/cutting device compresses and heats at least the upper food condiment sheet in the area adjacent to or in contact with the compression molding surface blades. This step also cuts and forms a sandwich-sized, single-serve, fused combination food condiment slice from the two mating food condiment sheets by cutting through the two food condiment sheets and bonding the edge portions of the two food condiment sheets together by heat molding of the peripheral edge portions adjacent the cut. A decorative design, crimping, or border, may also be embossed into the bonded periphery or another desired area of the sandwich-sized, single-serve, face-fused food condiment slice during the cutting and compression step.

A third method for fusing two separate food condiments to form a face-fused combination food condiment can be performed using a molding process such as extrusion molding or injection molding or pouring. This process produces individual sandwich-sized, single-serve, face-fused combination food condiment slices. The process uses a plurality of molds having the shape of the desired sandwich-sized, single-serve, food condiment slice. A predetermined quantity of a first food condiment is injected, poured, or extruded into the mold. The mold may be heated or cooled or be at room temperature depending on the process and the food condiment being molded. After a predetermined time, a predetermined quantity of a second food condiment is injected, poured, or extruded into the mold and over the upper surface of the first food condiment that was previously injected, poured, or extruded into the mold. The temperature of the second injected, poured, or extruded food condiment or the first injected, poured, or extruded food condiment, or both causes bonding of the two food condiments at their mating face surfaces. The mating face surfaces can be the entire face surfaces of the food condiments, or a portion thereof. The resulting sandwich-sized, single-serve, face-fused combination food condiment slice is then removed from the mold.

As an example, an individual preparing a sandwich desiring to use catsup and mustard on a sandwich can do so by removing a sandwich-sized, single-serve, face-fused combination food condiment slice of catsup and mustard from its hermetically sealed protective wrapping by opening the wrapping and removing the sandwich-sized, single-serve, face-fused combination food condiment slice of catsup and mustard. The sandwich-sized, single-serve, face-fused combination food condiment slice of catsup and mustard is then placed whole on a sandwich without the requirement and inconvenience of spreading, pouring, or squeezing the two condiments onto the bread or sandwich. The advantages of combining the condiments into a face-fused combination of two or more condiments are that only one package need be purchased rather than two or more; reduced weight and number of condiment packages when on outings vacations, picnics, and barbeques, for example; much easier to store—less storage space needed; and reduction in the time needed to prepare a sandwich or cook a food.

A modification of the second embodiment is to provide a sandwich-sized, singe-serve, side-fused combination food condiment comprising food condiments sections fused together at their edge or side portions to form a sandwich-sized, single-serve, side-fused combination food condiment slice. The term side-fused is used to distinguish it from face-fused. The sandwich-sized, single-serve, side-fused combination food condiment slices are individually wrapped with a hermetically sealed protective wrapping. A plurality of the individually wrapped, hermetically sealed, sandwich-sized, single-serve, side-fused combination food condiment slices can be further packaged for sale. The structure of the sandwich-sized, single-serve, side-fused combination food condiment slice has food condiment sections joined together by fusion of their edge or side portions. Each of the food condiment sections has a front face surface and a back face surface. Fusion of the food condiment slices forms a side-fused food condiment slice having a front face surface and a back face surface originating from the front and back face surfaces of the individual food condiment sections. Each of the food condiment sections is fused with at least a second one of said food condiment sections at their edge or side portions. Depending on the structure of the food condiment a portion of the edge or side portion of each condiment section or all of the edges or side portions is fused to the edges or side portions of an adjacent food condiment section. The front face surface of the sandwich-sized, single serve, side-fused combination food condiment slice is comprised of at least two food condiment sections and at least one food condiment. The back face surface is comprised of at least two food condiment sections and at least one food condiment. The first food condiment section and the second food condiment section, of the side-fused combination food condiment slice, are fused together at their edge or side portions. Fusion of the edge or side portions of the first and second food condiment sections forms a side-fused combination food condiment slice. The side-fused combination food condiment slice has a front face surface comprising at least two food condiment sections and a back face surface comprising at least two food condiment sections. The side-fused combination food condiment slice may have one or more food condiments making up the side-fused combination food condiment structure, if so desired. In this modification, side-fusing two separate food condiment sections to form a side-fused combination food condiment slice can be accomplished by initially forming two separate food condiment sheets, each of which can be formed by the molding methods previously disclosed in the first embodiment of the instant invention and hereby incorporated in this discussion. Also, face fused combination food condiment sheets can also be used in this modification and are formed by the molding methods previously disclosed in the second embodiment of this invention and is hereby incorporated in this discussion. After formation of the food condiment sheets, a cutting operation is performed to divide the single food condiment sheets into a plurality of cut shapes. The cutting operation can be performed using, for example, a die cutting apparatus which spans the length and width of the food condiment sheet such that the cut shapes are formed in a single mating of the die with the food condiment sheet. The cut shapes of one single food condiment sheet are matched and joined at their side surfaces to cut shapes formed from a second single food condiment sheet. The fusion of the cut shapes forms sandwich-sized, single serve, side-fused, combination food condiment slices, such that the shapes are placed into and fused within molds. Also, the shapes are paired or matched such that a side-fused, combination food condiment sheet is formed. The sheet can then be further divided to form sandwich-sized, single-serve, side-fused, combination food condiment slices. The method of forming sandwich-sized, single-serve, side-fused, combination food condiment slices using side fusion involves preheating the side surfaces of the cut shapes to their flow point and contacting the preheated side surfaces of the food condiment cut shapes together. As an example, a cutting operation can be used to cut rectangular strips from first and second single food condiment sheets. The cut food condiment rectangular strips from the first food condiment sheet are then positioned in an alternating side-by-side relationship with the cut food condiment rectangular strips from the second food condiment sheet. The side surfaces of the rectangular strips of the first and second food condiments are heated to their flow points and fused, resulting in a food condiment sheet having alternating first and second food condiment strips fused together at their side surfaces. The resulting food condiment sheet is then cut into strip sheets having a sandwich-sized width. The strip sheets having a sandwich-sized width along their horizontal axis are then further divided a plurality of times perpendicular to their longitudinal axis to provide a sandwich-sized length. The resulting food condiment is a sandwich-sized, single-serve, side-fused, combination food condiment slice. The number of alternating food condiment strips in a single food condiment slice is a function of the width of the food condiment strips cut from the first and second food condiment sheets. The widths are predetermined based on the total desired number of condiment strips, and the number of condiment strips of each type of condiment desired in the final sandwich-sized, single-serve, combination food condiment slice. It is noted that the first and second food condiment strips can be cut having a width such that upon side fusion of an appropriate number of the first and second food condiment strips, a food condiment sheet results having the sandwich-sized length or width. This step avoids the process of forming larger side-fused food condiment sheet versions requiring division of the larger side-fused food condiment sheet into strip sheets. Also, as previously mentioned, face fused combination food condiment sheets can also be used as a source of food condiment strips. The same alternating pattern and method can be used as discussed above for forming sandwich-sized, single-serve, side-fused combination food condiment slices. Individual food condiment slices can also be formed from the die cut operation by placement of the appropriate number of food condiment die cut sections into individual molds to form a desired pattern. Sections from different food condiment die cut sheets can be used to fit the desired pattern. Fusion of the side surfaces is then performed.

Additionally, two or more of the formed side-fused combination food condiment sheets or slices can be fusion bonded together at their face surfaces. The same pattern, condiments, and orientation can be used on both sheets. However, other patterns, condiments, and orientation can be substituted.

A third embodiment of the instant invention is to provide a sandwich-sized, single-serve, woven food condiment slice. The sandwich-sized, single-serve, woven food condiment slice is also individually wrapped with a hermetically sealed protective wrapping. A plurality of these individually wrapped, hermetically sealed, sandwich-sized, single-serve, woven food condiment slices can be stacked and further packaged for sale. The woven sheet can be manufactured by weaving strips and/or strands of a desired food condiment that have been cut from a food condiment sheet previously formed through extrusion molding, thin film molding, injection molding, compression molding, or any other process which will accomplish the objective of forming sheet-formed food condiments. Following formation of the food condiment sheets, the strips and/or strands of food condiment can be cut from the sheet of food condiment using a cutting operation. The strips and/or strands are then interwoven to form a woven food condiment sheet. The woven food condiment sheet comprises one or more food condiments. Strips and/or strands of one or more food condiments are woven together at any desired angle to each other. It is also noted that the strips and/or strands can be twisted along their longitudinal axis prior to weaving to provide a helical, coiled, or curled structure or form to the condiment strip and/or strand.

As an example of a particular structure and design for a woven food condiment, strips and/or strands of a first food condiment can be placed parallel or at an angle to each other on a work surface. A second food condiment in the form of strips and/or strands, which may be the same or different from the first food condiment, is then interwoven with the first food condiment at any desired angle. Any desired pattern of weaving can be used and any desired angle can be used. When a constant size, width, length, or thickness, of strands and/or strips are used in weaving the food condiment single serve slice, the degree of tightness, packing, or closeness of the strands and/or strips in a given direction or angle depends on the amounts of the first and second food condiments desired. The size, shape or thickness of the strands and/or strips can also be varied in conjunction with the degree of tightness, packing, or closeness of the strands and/or strips in the weaving to determine the number of strands and/or strips of each food condiment to be used in the weaving to obtain the desired amount of each food condiment for the resulting sandwich-sized, single-serve, woven food condiment. After the weaving step has been completed, a cutting operation is performed on the woven food condiment sheet to produce sandwich-sized, single-serve, woven food condiment slices. The sandwich-sized, single-serve, woven food condiment slices formed by the cutting operation can be of any desired geometrical shape; such as square, rectangular, circular, triangular, oval, etc. The next step in the process is to ensure that the sandwich-sized, single-serve, woven food condiment slices are retained in the woven form. To accomplish this, the peripheral edge portion of the woven food condiment slice can be compression molded, using a tool or device, to bond, tie, merge, or join together the margin ends of the overlapping strands and/or strips of the peripheral edge portion of the woven food condiment slice. The tool can also be heated, if desired, to a temperature which will allow at least one of the first food condiment or the second food condiment to flow and bond to at least one of the first food condiment or the second food condiment. The compression surface used for the compression operation may be combined with the cutting tool such that both the cutting and compression operations can be performed together. A decorative design or border may also be embossed into the periphery of the woven food condiment slice during the compression and optional heating step. As an alternative, a preformed edible edge sealer may be applied and heat sealed to the peripheral cut edges of the woven food condiment slice to retain the woven food condiment slice in its woven form by preheating the edible edge sealer to its flow temperature, applying the preheated edible edge sealer to the peripheral cut edges of the woven food condiment slice, and compressing the preheated edible edge sealer to bond the edible edge sealer to the peripheral cut edges of the woven food condiment slice to thereby retain the weaving pattern given to the woven food condiment slice. Alternatively, the preformed edible edge sealer can first be applied to the peripheral cut edges of the woven food condiment slice and, next, heat sealing the peripheral cut edges of the woven food condiment slice using a tool or device to compress and heat the preformed edible edge sealer to its flow temperature such that the preformed edible edge sealer flows into and around the interstices of the woven peripheral cut edges of the woven food condiment slice to bond the edible edge sealer to the peripheral cut edges of the woven food condiment slice to thereby retain the weaving pattern given to the woven food condiment slice.

The woven strips and/or strands may also be formed by extrusion of the strips and/or strands from an extrusion apparatus onto a work surface. The strips and/or strands may be formed from one or more food condiments. A plurality of extrusion nozzles can be used to extrude the food condiment to form the woven food condiment sheet with the desired angle between the strips and/or strands.

An alternative to the third embodiment of the instant invention is to provide a sandwich-sized, single-serve, woven food condiment slice comprising forming the sandwich-sized, single-serve, woven food condiment slice by weaving strands and/or strips of a face-fused combination food condiment into a woven sheet. This form of the woven food condiment is also individually wrapped with a hermetically sealed protective wrapping. A plurality of these individually wrapped, hermetically sealed, sandwich-sized, single-serve, combination, woven food condiment slices can be stacked and further packaged for sale. The combination woven food condiment sheet can be manufactured by weaving face-fused combination strips and/or strands comprised of the desired food condiments. The face-fused combination strips and/or strands are formed by a cutting operation performed on previously formed face-fused combination food condiment sheets. The first step for producing woven, sandwich-sized, single-serve, combination, food condiment slices is to produce food condiment sheets of a single food condiment. The method of producing food condiment sheets of a single food condiment was discussed previously in the first embodiment of the instant invention and is hereby incorporated in this discussion. As discussed, food condiment sheets can be formed through extrusion molding, thin film molding, injection molding, compression molding, or any other process or combination of processes which will accomplish the objective of producing sheet-formed food condiments. The next step is to produce face-fused combination food condiment sheets. Methods of producing face-fused combination food condiment sheets were discussed in the second embodiment of the instant invention and is hereby incorporated into this discussion. Following formation of the face-fused condiment food condiment sheet, strips and/or strands are cut from the face-fused combination food condiment sheet using a cutting operation. The strips and/or strands are comprised of a first food condiment bonded or face-fused to a second food condiment. The strips and/or strands have a first food condiment on a first face surface and a second food condiment on a second face surface. The strips and/or strands cut from the face-fused combination food condiment sheet are then interwoven to form a woven face-fused combination food condiment sheet. The strips and/or strands may be woven at any desired angle to each other. Also, since the strands and/or strips have one food condiment on one face and a second food condiment on the opposite face, the weaving operation may be accomplished such that the first food condiment is on one face of the woven combination food condiment sheet and the second food condiment is on the opposite face of the woven combination food condiment sheet. Alternatively, the weaving operation can be performed such that adjacent strips and/or strands used to form each face of the woven combination food condiment sheet can be reversed such that one strand or strip displays a first food condiment and the adjacent strand and/or strip displays a second food condiment. The result being that each face of the woven combination food condiment sheet has first and second food condiments displayed.

Additionally, the woven fused combination food condiment sheet may have strips and/or strands cut from a fused combination food condiment sheet and strips and/or strands cut from a food condiment sheet that is formed from only one food condiment. This method of weaving strips and/or strands cut from a fused combination food condiment sheet and strips and/or strands cut from a food condiment sheet formed from only one food condiment allows use of three condiments in a woven food condiment sheet. Three condiments can also be provided in a woven condiment sheet by weaving strips and/or strands from a fused combination food condiment sheet having three different condiments fused together. Also, weaving of strips and/or strands from a first fused combination food condiment sheet, formed from first and second food condiments, with strips and/or strands from a second fused combination food condiment sheet formed from third and fourth food condiments allows construction of a woven food condiment sheet having four different food condiments. Any number of condiments can be woven into a sheet woven combination food condiment sheet. As an additional embodiment, woven combination food condiment sheets can be formed from strips and/or strands from two different single condiment sheets. A second woven combination food condiment sheet can be formed from strips and/or strands from a third and fourth single condiment sheets. The two separate woven combination condiment food condiment sheets can then be combined at their face surfaces by preheating an edible bonding layer to its flow point. The preheated performed edible bonding layer is then applied to the upper surface of the first woven combination food condiment sheets such that the edible preheated bonding layer bonds to the strips and/or strands of the woven combination food condiment food condiment sheet. The second woven combination food condiment sheet is then applied to the opposite surface of the preheated preformed edible bonding sheet such that the edible preheated preformed edible bonding sheet bonds to the strips and/or strands of the second woven combination food condiment sheet. The woven combination food condiment sheet formed has a first outer face having a woven food condiment sheet comprised of woven food condiments and a second outer face, opposite the first face, and having a woven food condiment sheet comprised of woven food condiments. The two inner faces being joined in a face-to-face relationship by an edible bonding sheet. The edible bonding sheet also acts to retain the woven condiment strips and/or strands in a woven form for subsequent cutting and molding operations.

Alternatively, the woven strips and/or strands of the woven food condiment sheet can be retained in their woven form by preheating an edible sealant sheet to its flow point and applying the preheated edible sealant sheet to the upper exposed surface of the woven food condiment sheet such that the preheated edible sealant sheet contacts, melts, and flows over, into, and around the interstices of the woven strips and/or strands of the woven food condiment to thereby retain the weaving pattern given to the woven food condiment for subsequent cutting or molding operations.

A further alternative would be to spray the woven strips and/or strands of the woven food condiment sheet with a liquid edible bonding material prior to the cutting operation to retain the weaving pattern given to the woven food condiment.

As an example of a particular structure and design for a woven combination food condiment slice, face-fused strips and/or strands of a first face-fused combination food condiment sheet are placed parallel to each other on a work surface. A second face-fused combination food condiment in the form of face-fused strips and/or strands, which may be the same or different from the first face-fused combination food condiment, can then be interwoven with the first face-fused strips and/or strands at any desired angle. Any desired pattern of weaving can be used and any desired angle can be used. When a constant size, width, or length, of face-fused strands and/or strips are used in weaving the single-serve, combination food condiment sheet, the degree of tightness, packing, or closeness of the face-fused strands and/or strips in a given direction depends on the amounts of each of the food condiments desired. The size, shape or thickness of the face-fused strands and/or strips can also be varied in conjunction with the degree of tightness, packing, or closeness of the face-fused strands and/or strips in the weaving to determine the number of face-fused strands and/or strips of each food condiment to be used in the weaving to obtain the desired amount of each food condiment for the resulting sandwich-sized, single-serve, woven combination food condiment. After the weaving step has been completed, a cutting operation is performed on the woven combination food condiment sheet to produce sandwich-sized, single-serve, woven combination food condiment slices. The sandwich-sized, single-serve, woven combination food condiment slices formed by the cutting operation can be of any desired geometrical shape; such as square, rectangular, circular, triangular, oval, etc. The next step in the process is to ensure that the sandwich-sized, single-serve, woven combination food condiment slices are retained in the woven form. To accomplish this, the peripheral edge portion of the woven combination food condiment slice can be compressed, using a tool or device, to bond, tie, merge, or join the margin ends of the overlapping strands and/or strips of the peripheral edge portion of the woven fused combination food condiment slice together. The tool can also be heated to a temperature which will allow at least one of the first food condiment or the second food condiment of the face-fused strips and/or strands to flow and bond to at least one of the neighboring first food condiment or the second food condiment face-fused strips and/or strands. The compression surface may be combined with the cutting tool such that both the cutting and compression operations can be performed together. A decorative design, crimping, or border may also be embossed into the periphery of the woven combination food condiment slice during the compression and optional heating step.

As an alternative, a preformed edible edge sealer may be applied and heat sealed to the peripheral cut edges of the woven combination food condiment slice to retain the woven combination food condiment slice in its woven form by preheating the edible edge sealer to its flow temperature, applying the preheated edible edge sealer to the peripheral cut edges of the woven combination food condiment slice, and compressing the preheated edible edge sealer to bond the edible edge sealer to the peripheral cut edges of the woven combination food condiment slice to thereby retain the weaving pattern given to the woven food condiment slice.

Alternatively, the preformed edible edge sealer can first be applied to the periphery and cut edges of the woven fused combination food condiment slice and, next, heat sealing the periphery and cut edges of the woven combination food condiment slice using a tool to compress and heat the preformed edible edge sealer to its flow temperature such that the preformed edible edge sealer flows into and around the interstices of the woven periphery and cut edges of the woven combination food condiment slice to bond the edible edge sealer to the peripheral cut edges of the woven combination food condiment slice to thereby retain the weaving pattern given to the woven combination food condiment slice.

As an example of the third embodiment, an individual preparing a cold-cut sandwich desiring to use catsup and mustard on a sandwich can do so by removing a woven combination food condiment slice of catsup and mustard from the hermetically sealed protective wrapping by opening the plastic wrapping and removing the woven combination food condiment slice of catsup and mustard from the cellophane or plastic wrapping. The woven combination food condiment slice of catsup and mustard is then placed whole in or on a sandwich without the requirement and inconvenience of spreading, pouring, or squeezing the two condiments onto the bread, item, or sandwich. The advantages of combining the condiments into a woven combination food condiment slice are that only one package need be purchased rather than two or more bottles and jars; reduced weight and number of packages when on outings, vacations, picnics, and barbeques, for example; much easier to store— less storage space needed; and reduces time needed for preparing sandwiches or cooking a food item that uses a condiment of the instant invention.

A forth embodiment of the instant invention is to provide a sandwich-sized, single-serve, chopped food condiment slice comprising at least one food condiment. The at least one food condiment in the sandwich-sized, single-serve, chopped food condiment slice exists as a plurality of discontinuous or chopped pieces which are intermixed and fused together at their surfaces. The sandwich-sized, single-serve, chopped food condiment slices are individually packaged in a hermetically sealed protective wrapping. The chopped pieces of food condiment making up the chopped food condiment slice are intermixed with each other. If there is more than one condiment, the number of discontinuous, broken, or chopped pieces of each food condiment is approximately equal and proportionately mixed in the sandwich-sized, single-serve, chopped food condiment slice. However, there may be variation in which one of the chopped food condiments may be present in a larger amount than the other chopped food condiments. The sandwich-sized, single-serve, chopped food condiment slice can be formed by first producing a sheet formed chopped food condiment sheet. The chopped food condiment sheet may be formed from a chopped food condiment sheet of a single food condiment, or a plurality of food condiments, or a face-fused food condiment sheet, or a side-fused food condiment sheet, or any combination thereof. Initially, a food condiment sheet of a single food condiment is produced. The method of producing the food condiment sheets of a single food condiment was discussed in the first embodiment of the instant invention and is hereby incorporated in this discussion. The method of producing face-fused combination food condiment sheets was discussed in the second embodiment of the instant invention and is hereby incorporated in this discussion. As discussed, food condiment sheets can be formed through extrusion molding, thin-film molding, injection molding, compression molding, or any other process, or combination of processes that will accomplish the objectives of forming sheet-formed food condiments. After forming a food condiment sheet of a single food condiment, or a face-fused combination food condiment sheet, or a side-fused combination food condiment, the food condiment sheet is divided, by cutting, to form chopped food condiment pieces. The cutting operation can be performed using a die cutter with a width and length equal to or larger than the food condiment sheet wherein the cutting apparatus is used to stamp the food condiment sheet to form a plurality of food condiment pieces. The food condiment pieces can then be processed through a hopper or chamber which will eject the chopped pieces of food condiment, by air or inert gas blowing, at a sheet-forming mold to form a chopped food condiment sheet, or a slice-forming mold to form a sandwich-sized, single-serve, chopped food condiment slice. The temperature of the air used to blow the chopped food condiment pieces should be such that it heats, cools, or maintains the temperature of the outer surfaces of the chopped food condiment pieces so that the chopped food condiment pieces will adhere to each other at their contacting surfaces after distribution in the mold. If a chopped food condiment sheet is formed through the blowing operation, the chopped food condiment sheet is thereafter processed through a subsequent cutting step in which the chopped food condiment sheet is divided into separate sandwich-sized, single-serve, chopped food condiment slices. The chopped food condiment sheet can be made by blowing one or more different types of food condiments into a mold to form a chopped combination food condiment sheet. Also, fused condiment pieces that originate from fused combination food condiment sheets can be used to form chopped food condiment sheets, in which they alone are used, or the fused chopped food condiment pieces can be used in conjunction with chopped food condiment pieces of a single food condiment. That is, different combinations of food condiment pieces can be used to form a chopped food condiment sheet. The cutting device used to perform the cutting operation to form sandwich-sized, single-serve, food condiment slices may optionally have a surface used for compression and optionally both the compression surface and cutting surface may be heated to a temperature that will allow at least one of the food condiments represented in the chopped food condiment sheet to flow. The compression surface, if desired, allows a decorative design or border, to be embossed into the periphery or other desired area of the chopped food condiment slice during the cutting step and compression step. The compression surface of the device mates with and compresses a peripheral portion of the chopped food condiment slice. It may also provide or form a raised border, or crimped border to the chopped food condiment slice. The optional heating of the cutting blades to the flow point temperature of at least one of the chopped food condiments, provides smooth cut edges to the sandwich-sized, single-serve, chopped food condiment slice. If a sandwich-sized, single-serve, food condiment slice is formed by the blowing operation, then the sandwich-sized, single-serve, food condiment slice is removed from the mold before, after, or during cooling.

The food condiment pieces may also be formed by extrusion, in which the food condiment is extruded. The extruded food condiment can be cut or divided as it is extruded, or it can be extruded and divided in a separate cutting operation. The extruded food condiment pieces can then be processed through a hopper which ejects the extruded cut pieces of food condiment, by air or inert gas blowing, at a sheet-forming mold to form a sheet, or at a slice-forming mold to form a sandwich-sized, single-serve, chopped food condiment slice. The extrusion apparatus may also provide multiple extrusion outlets that allow extrusion and division of more than one food condiment. Also, the extrusion apparatus can provide for fusion and bonding of different types of food condiments at their surfaces during extrusion. The bonded extruded food condiment is then divided by cutting into chopped food condiment pieces. Depending on the temperature of the extruded, cut, food condiment, the temperature of the air or inert gas used to blow the chopped food condiment pieces should be such that it heats, cools, or maintains the temperature of the outer surfaces of the chopped food condiment pieces so that the chopped food condiment pieces will adhere to each other at their contacting surfaces in the mold. The ejection apparatus used to eject the cut pieces of food condiment at the molding surfaces, can also be used to coat the cut condiment pieces with an edible bonding material, such as by spraying an edible bonding material in liquid form on the cut extruded condiment pieces prior to their entry into the ejection apparatus, during residence in the ejection apparatus, or following ejection from the ejection apparatus, so as to enhance adhesion of the food condiment pieces at their contacting surfaces.

Another method of forming side-fusion food condiment slices involves an alternative extrusion and cutting method. The extrusion apparatus is provided with extrusion nozzles with the desired shape through which food condiment compositions are extruded. To enhance fusion and bonding of the extruded food condiment materials, the exit portion of the extrusion nozzles may be heated to the flow point of the extruded condiments. As the heated surfaces of the extruded condiments contact, adhesion and bonding occur to attach the individual extruded food condiments together at their longitudinal side surfaces, thereby forming a food condiment loaf Following extrusion, the formed food condiment loaf is divided into slices or discs, as by cutting. Any number of extrusion nozzles, types of condiments, and extruded condiment shape can be used.

As an example, an individual preparing a cold-cut sandwich desiring to use catsup and mustard on the sandwich can do so by removing a sandwich-sized, single-serve, chopped combination food condiment slice of catsup and mustard, which is formed of intermixed food condiment pieces of catsup and mustard fused at their surfaces, from a hermetically sealed protective wrapping by opening the wrapping and removing the sandwich-sized, single-serve, chopped combination food condiment slice of catsup and mustard and then placing the slice on the sandwich without the requirement and inconvenience of spreading, pouring, or squeezing the two condiments onto the bread or sandwich. The advantages of combining the at least two condiments into a chopped form are that only one package need be purchased rather than two or more; reduced weight and number of packages when on outings vacations, picnics, or barbeques, for example; much easier to store—less storage space needed; and reduces time needed for preparing sandwiches or cooking a food item.

Examples include sandwiches made at home for eating at lunch, sandwiches made by a restaurant for delivery or take-out service, and sandwiches prepared, packaged and displayed in a grocery store deli or convenience store for subsequent sale to a customer. A sandwich is made by placing a first slice of bread on a work surface, placing a single-serve food condiment slice on the first slice, placing a sandwich filler or optionally placing a sandwich filler on the single-serve food condiment slice, placing a second slice of the same or different single-serve food condiment slice or optionally placing a second food condiment slice of the same or different single-serve food condiment. The single-serve food condiment slice, optional sandwich filler, optional second single-serve food condiment slice, and other desired sandwich filler food items can be added to the sandwich in any desired order. It is noted, however, that initial placement of the single-serve food condiment on the bread surface may shield the bread slice from moisture by additionally functioning as barrier to moisture, which aids in preventing sogginess of the bread.

A further embodiment, which is drawn to beverages, includes forming dairy or non-dairy creamer or coffee creamer beverage slices for coffee, tea, hot chocolate, cold chocolate, or other food or beverage items. The dairy or non-dairy creamer or coffee creamer beverage condiment slice can also be sweetened and/or flavored. As an example, an individual preparing a cup of coffee, and desiring cream for the coffee, would add a dairy or non-dairy coffee creamer beverage slice to the coffee and stir. The coffee creamer beverage slice dissolves in the coffee releasing and distributing the dissolved coffee creamer beverage slice to the coffee solution. If the individual desires a sweetener, the coffee creamer beverage slice can also be combined with sugar or an artificial sweetener. This allows an individual to add cream and sweetener to the coffee without the inconvenience of adding two different beverage condiments separately. The beverage slices of the instant invention are made using the same methods as used to prepare the food condiment slices of the instant invention. Also, the beverage slices of the instant invention may have the same structures, sizes, and shapes as the food condiment slices of the instant invention. It is noted that the dairy or non-dairy coffee or tea creamer beverage slice may also be used on food items such as ice cream or strawberries.

A further embodiment is drawn to spaghetti sauces which are formed into food slices according to the methods described in the instant invention. A spaghetti sauce sheet or slice of desired size, flavorings, additives, ingredients, etc., can be laid over prepared noodles and heated, as by microwave, to melt the spaghetti sauce sheet or slice over the noodles. The spaghetti sauce sheet or slice may also be heated separate from the noodles and poured over the noodles, if desired.

A further embodiment of the instant invention is drawn to gravy slices for meats, mashed potatoes, whole potatoes, etc. A gravy sauce slice of desired size, flavoring, additives, ingredients, etc., can be laid over the prepared food item. The heat from the food item can melt the gravy sauce slice or the food with the gravy sauce slice thereon can be heated, as by microwave, to melt the gravy slice. The gravy sauce slice can also be heated and melted separate from the food item and then poured over the food item.

It is noted that the food condiment slices of the instant invention may be low fat, no fat, salt-free, cholesterol-free, and sugar-free, if desired.

It is noted that any of the food condiment slices produced by the instant invention can be formed from one or more of the following condiments and may exist in any of the shapes, forms, designs, or condiment combinations of the instant invention. That list comprises catsup, ketchup, mustard, mayonnaise, barbeque sauce, steak sauce, tartar sauce, peanut butter, jellies, jams, preserves, cheeses, cheese spreads, butter, honey butter and other flavored butters, margarine and flavored margarines, marinades, creamers, syrups, spaghetti sauces, gravy sauces, teriyaki sauce, soy sauce, glazes, salad dressings, or any other types of spreads, or food dressings.

BRIEF DESCRIPTION OF THE DRAWINGS

Throughout the drawing figures, like reference numerals refer to like parts. The design features of the embodiments represented in the drawings are not intended to be restrictive to the inventive concept and other variations or modifications to the design features shown may be applied.

DETAILED DESCRIPTION OF THE INVENTION

The following descriptions are presented to enable any person skilled in the art to make and use the invention, and are provided in the context of a particular application and its requirements. Various modifications to the disclosed embodiments will be readily apparent to those skilled in the art, and the general principles defined herein may be applied to other embodiments and applications without departing from the spirit and scope of the invention. The present invention is not intended to be limited to the embodiments described, but to be accorded with the widest scope consistent with the principles and features disclosed herein.

Additionally, all tool surfaces, device surfaces, mold surfaces, apparatus surfaces, in contact with the food condiment ingredients used in conjunction with the instant invention for forming, manufacturing and processing the food condiment articles of the instant invention are non-stick surfaces, have anti-stick coatings, or have PTFE surfaces or coatings.

Single Food Condiment Slice

Figure 1:
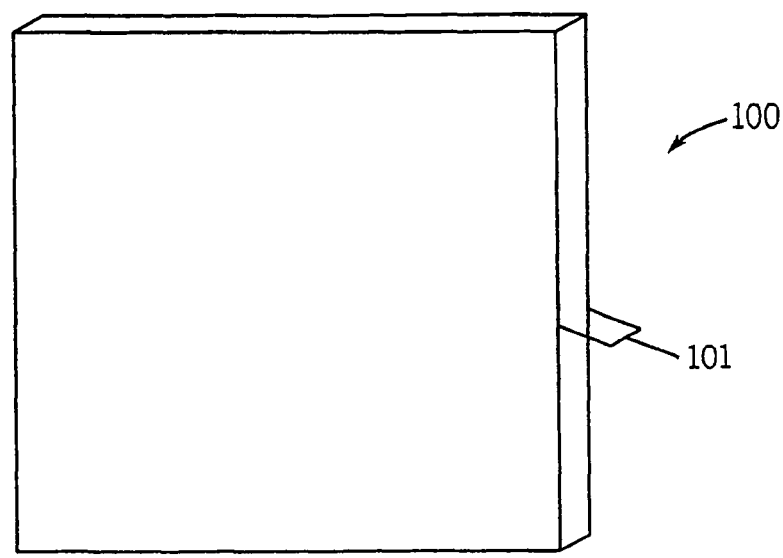
FIG. 1 is a perspective view of a single-serve food condiment of the instant invention having a square or rectangular shape.
Figure 2:
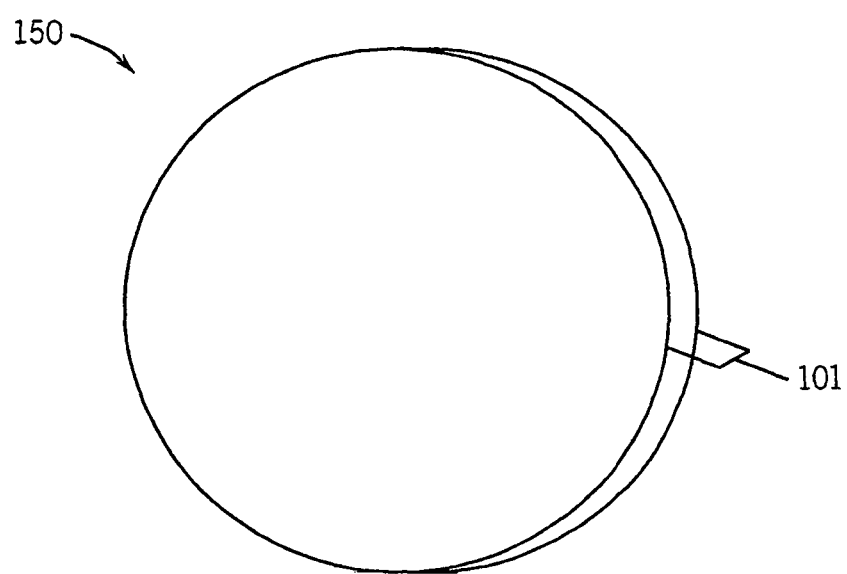
FIG. 2 is a perspective view of a single-serve food condiment of the instant invention having a circular shape.

The new and improved food condiment slice 100 of the instant invention, as shown by FIG. 1, can be applied to sandwiches, hamburgers, hotdogs, bagels, pitas, English muffins, muffins, fish sandwiches, tortillas, crackers, croissants, cold-cuts, and any other types of sandwiches or other food products. The food condiment slice 100 of FIG. 1 is a sandwich-sized, single-serve, food condiment slice, such that it substantially fits the face surface of a slice of bread. However, the food condiment slice can have any desired geometrical structure, such as: square, circular, rectangular, triangular, oval, etc. The food condiment slice may also be of any desired size. A circular food condiment slice 150 is shown in FIG. 2. The food condiment slice 100 is a single food condiment slice formed from a single food condiment, such as catsup, ketchup, mustard, mayonnaise, barbeque sauce, steak sauce, tartar sauce, peanut butter, jellies, jams, preserves, cheeses, cheese spreads, butter, honey butter and other flavored butters, margarine and flavored margarines, creamers, syrups, spaghetti sauces, gravy sauces, teriyaki sauce, soy sauce, glazes, salad dressings, or any other types of spreads, or food dressings. The food condiment slice 100 can be wrapped in a hermetically sealed, protective wrapping, such as plastic or thermoplastic material. The thickness of the food condiment slice can be of any desired thickness.

Figure 3:
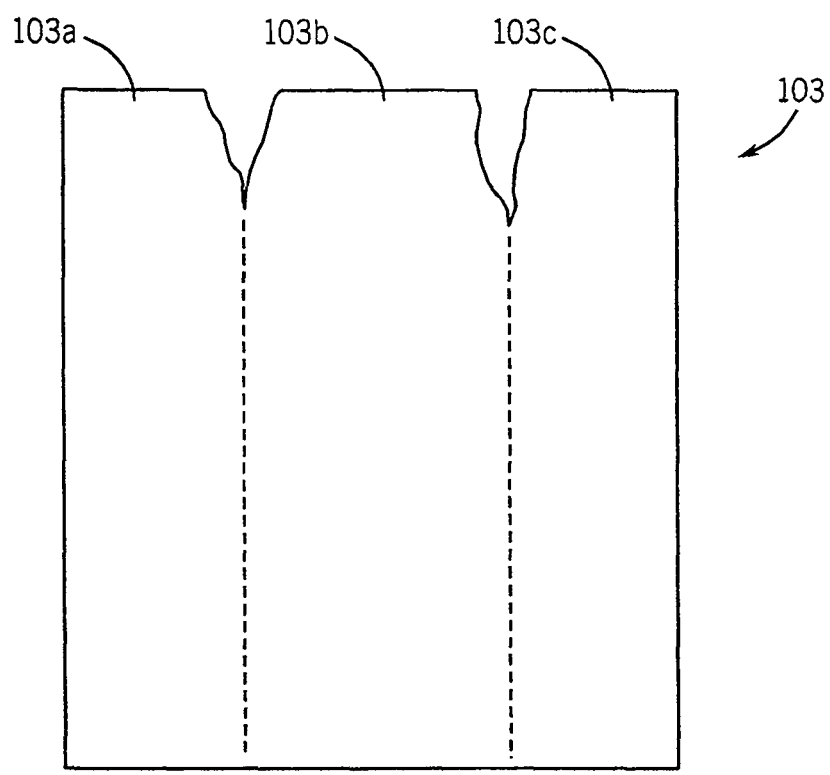
FIG. 3 is a view of a food condiment sheet showing dotted lines along which the food condiment sheet is divided to form food condiment strip sheets.

The food condiment slice 100 can be formed from a large food condiment sheet 103, as shown in FIG. 3. The large food condiment sheet 103 can be formed using molding processes such as: extrusion molding, thin film molding, injection molding, compression molding, or any other process or combination of processes that will accomplish the objective of forming large sheet-formed food condiments. The large food condiment sheet 103 may have any desired thickness and is generally the thickness 101 of the final sandwich-sized, single-serve food condiment slice 100 or 150. However, the thickness 101 can vary depending on subsequent steps in the process. The formed food condiment sheets 103 are subsequently divided, by using a cutting operation, along the indicated dotted lines, into food condiment strip sheets 103a, 103b, and 103c. The food condiment strip sheets 103a, 103b, and 103c, are then subsequently divided perpendicular to their longitudinal axis as indicated by the dotted lines in FIG. 4, which shows division of strip sheet 103a to form sandwich-sized, single-serve, food condiment slices 104a, 104b, 104c, and 104d. It is noted that any number of strips sheets can be formed from food condiment sheets 103. The food condiment strip sheets 103a, 103b, and 103c, are merely used for illustrative purposes.

Figure 15:
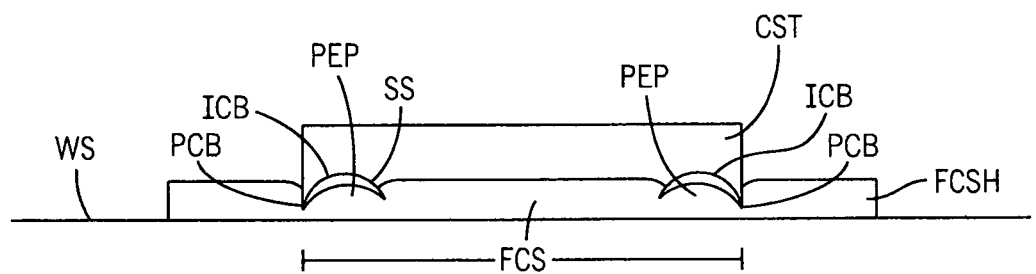
FIG. 15 is a cross-sectional view of a cutting/shaping tool used to form individual food condiment slices by cutting them from food condiment sheets.
Figure 17:
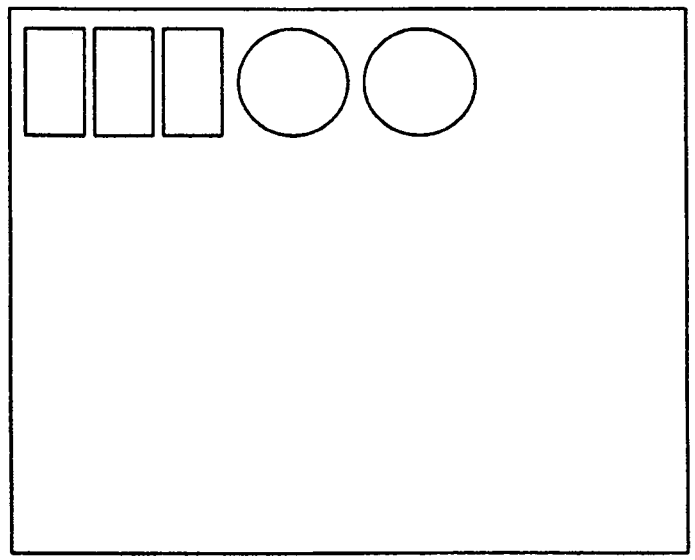
FIG. 17 is a view of a food condiment sheet with shaped holes formed from extraction of food condiment slices.

A second method for forming sandwich-sized, food condiment slices is by using a cutting tool which has heated cutting blades, or non-heated cutting blades. The device used to perform the cutting step may optionally have a surface used for compression and shaping and the compression or shaping surface may be heated or non-heated to a temperature which will allow the food condiment to flow for shaping. The compression or shaping surface, although not required as part of the device, allows a decorative design, indicia, crimping, or border to be embossed or shaped into the periphery or other desired area of the food condiment slice during the cutting step. It may also provide or form a raised border to the sandwich-sized, single-serve food condiment slice by shaping the food condiment material. The cutting blades of the device may be heated to the flow point temperature of the food condiment during the cutting step to provide smooth cut edges to the sandwich-sized, single-serve, food condiment slices. The cutting/shaping device can have a plurality of the cutting/shaping surfaces arranged in a side-by-side relationship to simultaneously produce a plurality of sandwich-sized, single-serve food condiment slices. The method comprises providing a food condiment sheet on a work surface WS, as shown in FIG. 15. The food condiment sheet FCSH is divided using the cutting/shaping tool CST by contacting the food condiment sheet FCSH with the cutting/shaping tool CST. The cutting/shaping tool CST is pressed against the food condiment sheet FCSH such that the peripheral cutting blades PCB penetrate and completely cut through the food condiment sheet FCSH. The inner cutting ICB blade does not completely cut through the peripheral edge portions PEP contacted during the penetration by the heated compression or shaping surface SS which is formed from the inner cutting blade ICB and is adjacent the peripheral cutting blades PCB such that the peripheral or edge portions PEP of the food condiment slice being formed are made to flow and are shaped by the heated shaping surface SS. The cutting and shaping operation forms a sandwich-sized, food condiment slice FCS. After the cutting and shaping operations, the cutting/shaping tool CST is withdrawn from the food condiment sheet FCSH and the formed sandwich-sized, food condiment slice is removed from the food condiment sheet FCSH and the operation may be repeated. If the cutting/shaping tool CST used has a plurality of the cutting/shaping surfaces arranged in a side-by-side relationship, the plurality of sandwich-sized, single-serve food condiment slices formed are then removed from the food condiment sheet FCSH, and the process may be repeated. FIG. 17 shows the food condiment sheet with holes formed by the removal of sandwich-sized food condiment slices following the cutting and shaping operation.

Figure 16:
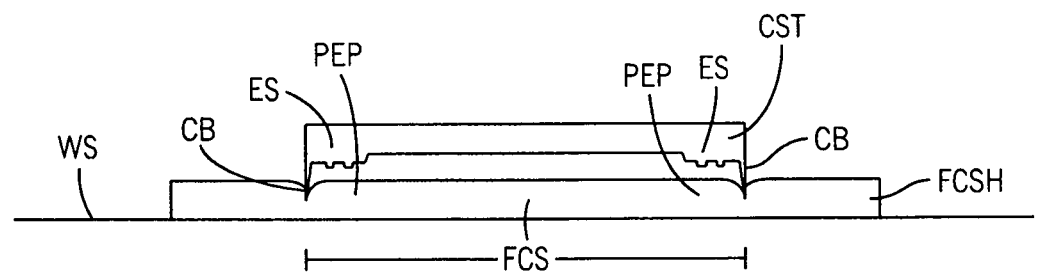
FIG. 16 is a cross-sectional view of a cutting/shaping tool used to cut individual food condiment slices from food condiment sheets.

A modification of this process is shown in FIG. 16, wherein the food condiment sheet FCSH is divided using the cutting/shaping tool CST by contacting the food condiment sheet FCSH with the cutting/shaping tool CST. The tool CST is pressed against the food condiment sheet FCSH such that the cutting blades CB penetrate and cut through the food condiment sheet FCSH. The peripheral edge portions PEP are subsequently contacted by the heated compression or shaping surface having an embossing surface ES adjacent the cutting blades CB such that the peripheral or edge portions PEP of the food condiment slice FCS are made to flow and are shaped by the heated embossing surface ES. The cutting and shaping operation forms a sandwich-sized, food condiment slice FCS.

A third manufacturing process to produce the sandwich-sized, single-serve, slices of food condiment involves a process that does not require formation of large condiment sheets 103, as shown in FIG. 3, followed by its subsequent division. This manufacturing process can include molding processes such as extrusion molding, injection molding, pouring, or any other process or combination of processes to accomplish the objective of forming food condiment slices, of the food condiment into individual molds having the desired final shape for the food condiment slice. The mold can have the desired designs, indicia, or cavities, for providing or forming borders, words, or designs, to the final food condiment slice. Following the molding process, the molded sandwich-sized, single-serve, food condiment slices are removed from the individual molds followed by the step of individually wrapping, using a hermetically sealable protective wrapping, each single-serve, sandwich-sized, food condiment slice. This process can be continuous using a plurality of molds and a conveying operation in which the molds file through a filling station, wherein each mold receives food condiment material by at least injection, pouring, or extrusion. The food condiment materials then take the form of the mold surface. The food condiment material is heated or cooled depending on the condiment material and process.

A fourth molding process utilizes a large mold comprising an array of individual molding compartments or sections for forming food condiment slices having the desired shapes, designs, or cavities, for forming borders, words, designs, on the final food condiment slice. Following the molding process, the molded sandwich-sized, food condiment slices are removed from the individual molding compartments.

Combination, Face-Fused, Food Condiment Slice

The second embodiment of the instant invention is to provide a sandwich-sized, singe-serve, combination food condiment comprising at least two food condiments fused together at their face surfaces to form a sandwich-sized, single-serve, face-fused, combination food condiment slice.

Figure 5:
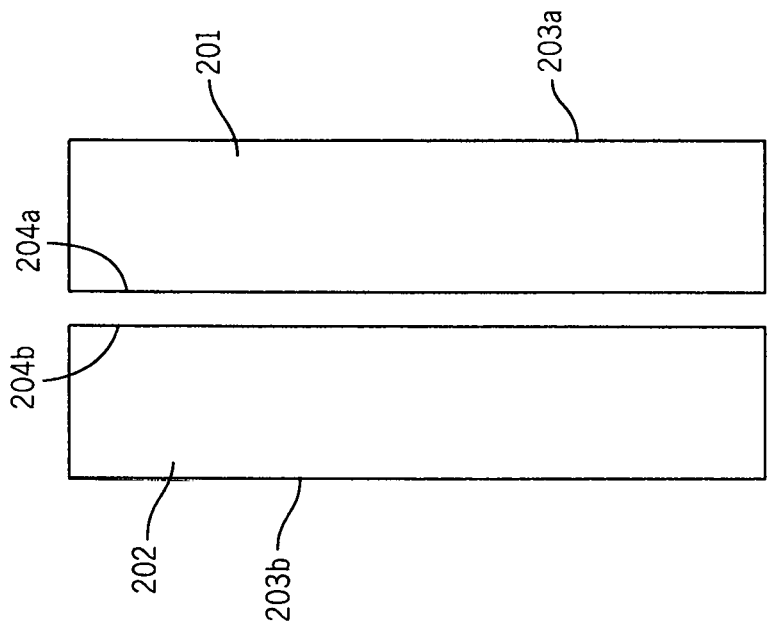
FIG. 5 is a side view of two different face-fused food condiments.
Figure 6:
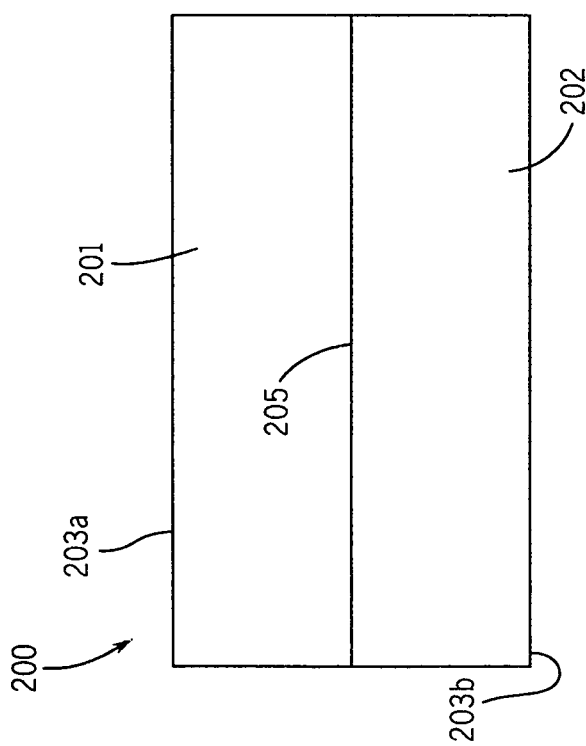
FIG. 6 is a side view of two different food condiments face-fused together by a fusion process.

The embodiment of the instant invention provides a sandwich-sized, singe-serve, combination food condiment comprising at least two food condiments fused together to form a sandwich-sized, single-serve, face-fused combination food condiment slice, as shown by the cross sectional drawings of FIGS. 5 and 6. The structure of the sandwich-sized, single-serve, face-fused, combination food condiment slice, having two food condiments 201 and 202, has two outer face surfaces 203a and 203b, and two inner face surfaces 204a and 204b. The two inner face surfaces 204a and 204b are fused to each other forming a fusion interface 205. The first outer face surface 203a is comprised of a first food condiment 201. The second outer face surface 203b is comprised of a second food condiment 202. It is noted that the first food condiment 201 and the second food condiment 202 can be the same. The first food condiment 201 and the second food condiment 202, of the fused combination food condiment slice 200, are fused together at their inner face surfaces 204a and 204b. Fusion of the inner face surfaces 204a and 204b of the first and second food condiment slices 201 and 202 forms a face-fused combination food condiment slice 200 comprising a fusion interface 205. The fused combination food condiment slice 200 has a first face side 203a comprising a first food condiment 201 and a second face side 203b comprising a second food condiment 202. As noted previously, the first food condiment 201 can be the same food condiment as the second food condiment 202. The face-fused combination food condiment slice 200 may also have additional food condiments added to the fused combination food condiment structure, if so desired. A resulting food condiment structure comprising three single food condiment slices would have one of the three single food condiment slices sandwiched between and fused to the inner face surfaces of the outer two food condiment slices. An example of this structure would be a food condiment jelly slice sandwiched and fused between two food condiment peanut butter slices. Also, one food condiment peanut butter slice can be sandwiched between two food condiment jelly slices.

Methods of Forming Combination, Face-Fused, Food Condiment Slice

Figure 7:
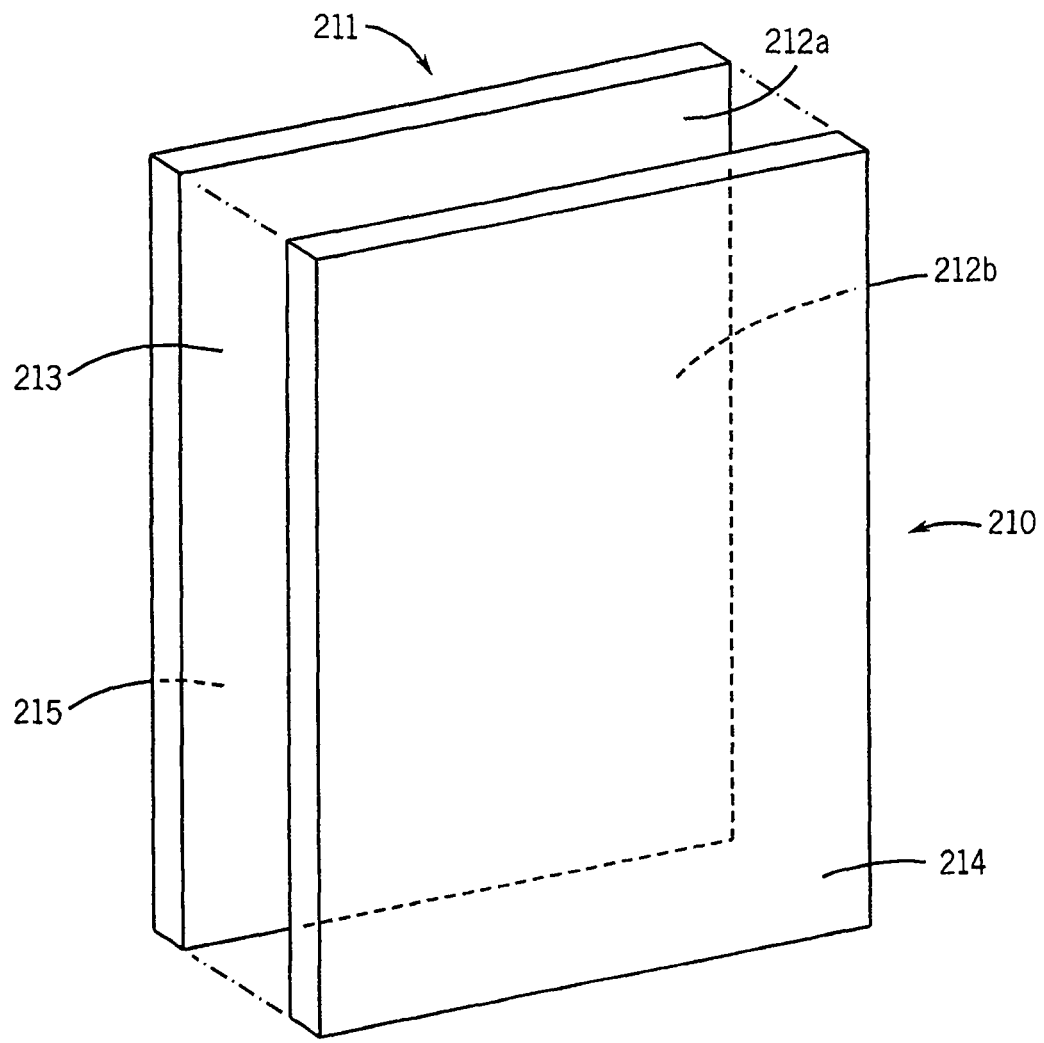
FIG. 7 is a front view showing two food condiment sheets being positioned for fusion of the inner faces of two food condiment sheets.
Figure 8:
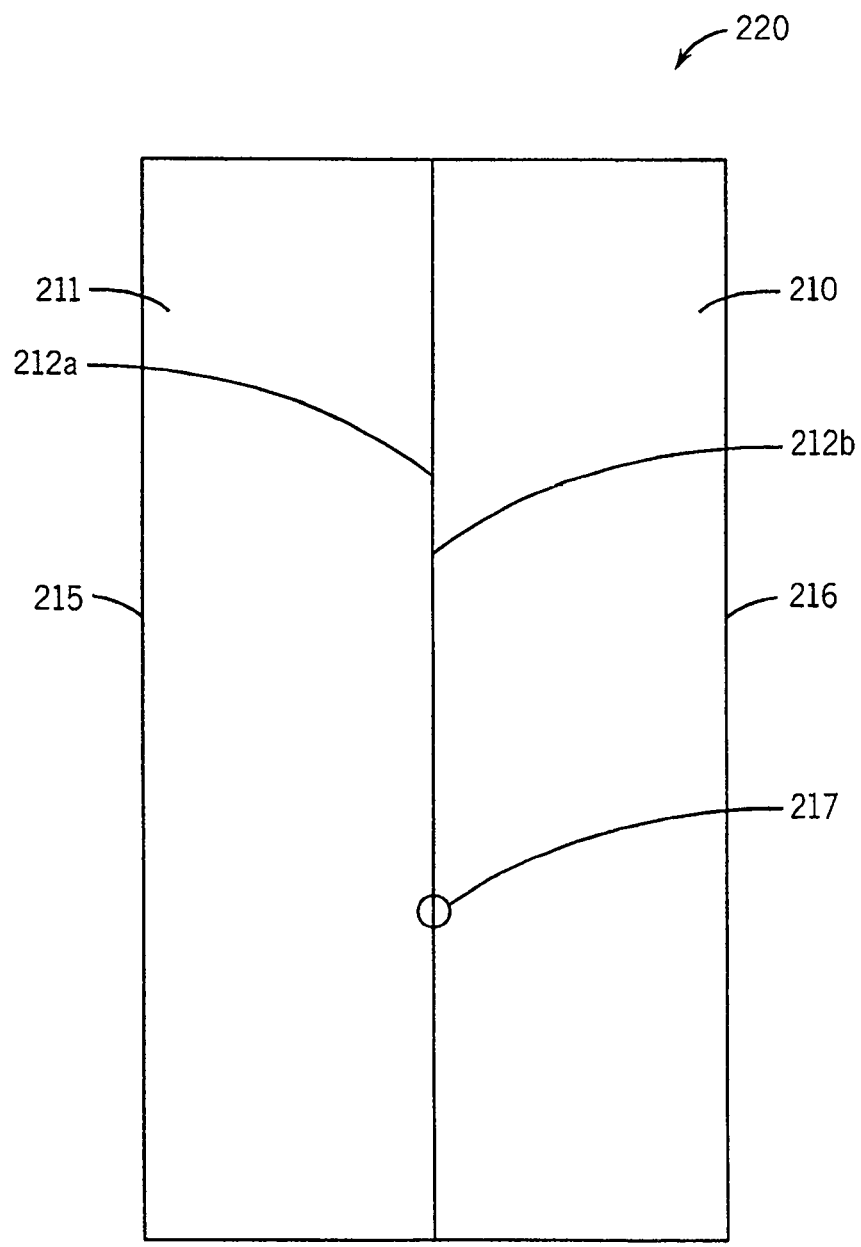
FIG. 8 is a side-view showing the fusion of the sheets shown in FIG. 7.

Formation of the face-fused combination food condiment slices can be accomplished by different methods. A first method provides steps for making a face-fused combination food condiment slice having two different food condiments. Initially, each of two separate food condiment sheets 210 and 211, as shown in FIG. 7, which can be formed by the molding methods previously disclosed in the first embodiment of the instant invention and are hereby incorporated in this discussion, is heated on one of its surfaces 212a and 212b (212b is referencing the opposite face as that closest to the viewer) to the flow point of the food condiment 213 and 214 making up food condiment sheets 211 and 210, respectively. The heated surfaces of the two separate food condiment sheets 210 and 211 are then mated or contacted together such that the heated and mated surfaces 212a and 212b bond together to form a face-fused combination food condiment sheet 220, as shown by the cross sectional view in FIG. 8. The first food condiment sheet 211 forms one outer face surface 215 of the face fused combination food condiment sheet 220 and the second food condiment sheet 210 forms the opposite outer face surface 216 of the face fused combination food condiment sheet 220 having a bonding interface 217 made up of the inner face surfaces 212a and 212b. The fused combination food condiment sheet is then processed through a cutting step in which the face fused combination food condiment sheet 220 is divided, by cutting, into separate face-fused food condiment strip sheets or into sandwich-sized, single-serve, face fused combination food condiment slices. When forming face-fused combination food condiment strip sheets, face-fused combination food condiment sheet 220 is divided using the cutting process as shown by and used in conjunction with FIG. 3. When the face-fused combination food condiment strip sheets have been formed, they are each subsequently divided perpendicular to their longitudinal axis to form a plurality of sandwich-sized, single-serve, face-fused combination food condiment slices, as shown by the cutting process of FIG. 4.

Figure 4:
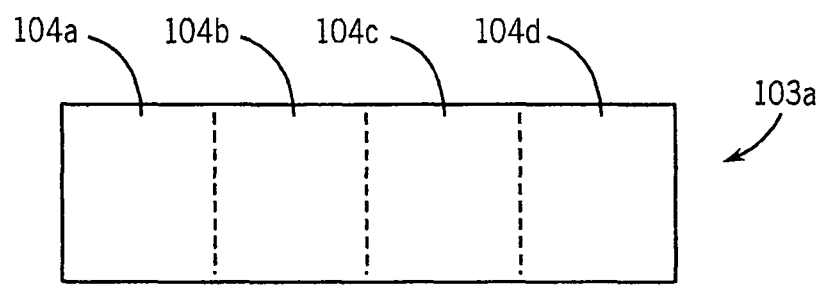
FIG. 4 is a view of a food condiment strip sheet formed from the food condiment of FIG. 3. The dotted lines are where the strip sheet is divided perpendicular to its longitudinal axis to form single-serve food condiment slices.
Figure 9:
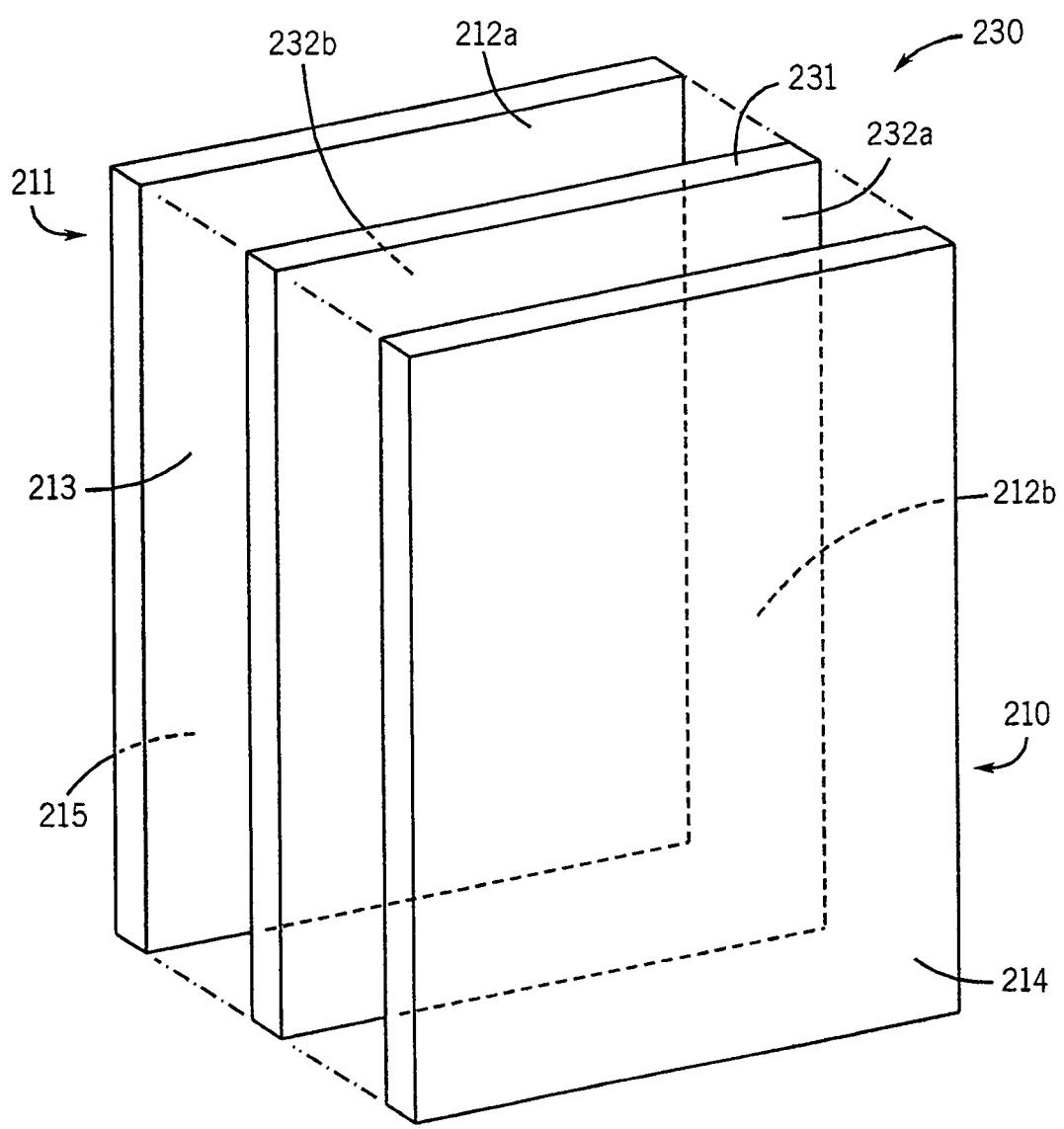
FIG. 9 is a front face view showing the positioning of two food condiment sheets sandwiching an edible bonding layer.
Figure 10:
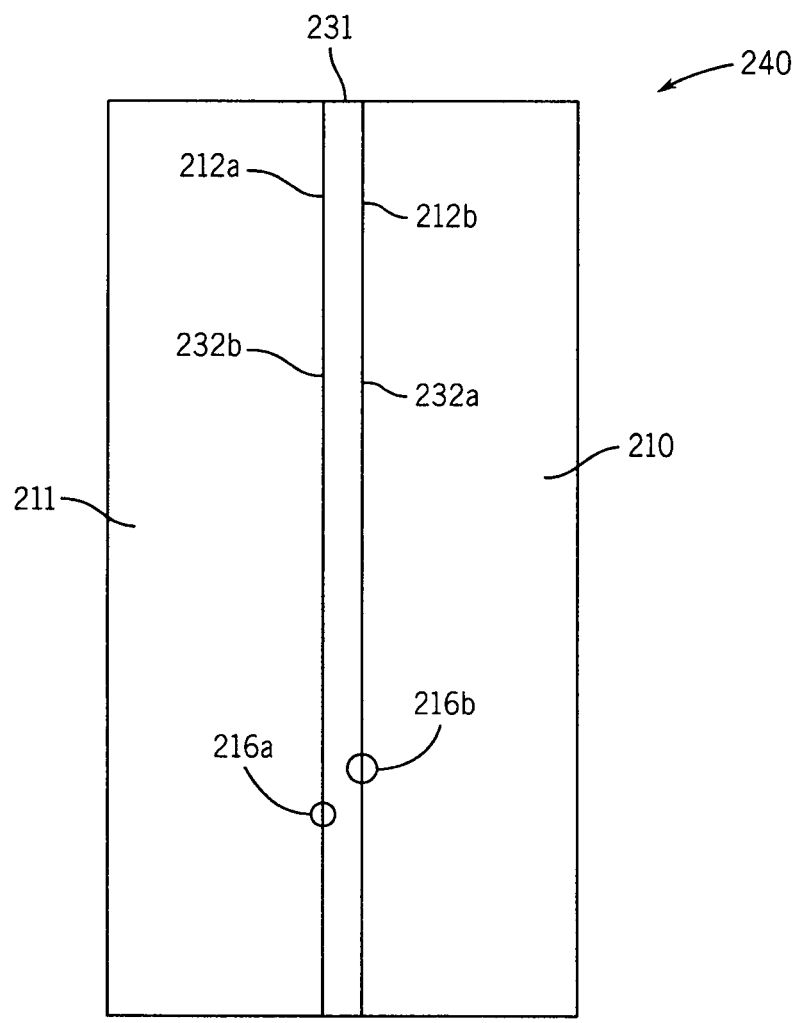
FIG. 10 is a side view showing the fusion of the food condiment sheets and the edible bonding layer of FIG. 9.

A second modification of the fusion bonding method includes using, an edible bonding layer 231, as shown in FIG. 9, which may be sandwiched between the first food condiment sheet 211 and the second food condiment sheet 210 to join the two food condiment sheets together, as given by 230. In this alternative bonding method, the edible bonding layer 231 can be preheated on both of its sides to its flow temperature and mated or contacted to the two food condiment sheets 210 and 211 in separate steps. One of the two preheated face surfaces 232b of the edible bonding sheet 231 is mated and bonded with an inner face surface 213 of the first food condiment sheet 211. Then, the other preheated face surface 232a of the edible bonding sheet 231 is then mated and bonded to an inner face surface 212b of the second food condiment sheet 210. It is noted that because both face surfaces 232a and 232b of the edible bonding sheet 231 have been preheated to the flow point of the edible bonding sheet 231, the mating and bonding steps may alternatively occur simultaneously, wherein both food condiment sheets 210 and 211 are mated and bonded to the edible bonding sheet 231 in a single step, rather than mating and attaching one food condiment sheet and then mating and attaching the other food condiment sheet in separate steps. As a further alternative, one face surface 232*b* of the edible bonding sheet can be preheated to the flow point temperature of the edible bonding sheet 231 material and then mated with an inner face surface 212*a* of the first food condiment sheet 211. Following this bonding step, the opposite face surface 232*a* of the edible bonding sheet 231 is preheated to the flow point temperature of the edible bonding sheet 231 and mated with an inner face surface 212*b* of the second food condiment sheet 210. The resulting fused combination food condiment sheet 240, as shown by the cross sectional view of FIG. 10, shows the edible fusion bonding layer 231 forming a fusion interface at 216*a* between the edible bonding layer surface 232*b* and the inner face surface 212*a* of food condiment sheet 211. Also shown is the opposite surface of edible fusion bonding layer 231 forming a fusion interface at 216*b* between the edible bonding layer surface 232*a* and the inner face surface 212*b* of food condiment sheet 210. The resulting face fusion bonded combination food condiment sheet 240 having an edible bonding sheet, which results from any of the above mating and bonding processes described, is then processed through a cutting step in which the fused combination food condiment sheet is divided, by cutting, into separate strip sheets, as that shown by the cutting process of FIG. 3, or into sandwich-sized, single-serve, face-fused, combination food condiment slices. When forming face-fused combination food condiment strip sheets, the resulting strip sheets are subsequently divided into sandwich-sized, single-serve, fused combination food condiment slices, as shown by the cutting process in FIG. 4. While FIGS. 3 and 4 are drawn to describing the method for cutting single food condiment sheets, the same cutting processes described therein can be used to cut and divide fused combination food condiment sheets.

A third process involves using a cutting tool which has heated cutting blades, or non-heated cutting blades. The device used to perform the cutting step may have a surface used for compression or shaping and the compression or shaping surface may be heated or non-heated to a temperature which will allow the food condiment to flow for shaping. The compression or shaping surface, although not required as part of the device, allows a decorative design, indicia, crimping, or border to be embossed or shaped into the periphery or other desired area of the food condiment slice during the cutting step. It may also provide or form a raised border to the sandwich-sized, single-serve food condiment slice by shaping the food condiment material. The cutting blade of the device may be heated to the flow point temperature of the food condiment during the cutting step to provide smooth cut edges to the sandwich-sized, single-serve, food condiment slices. The cutting/shaping device can have a plurality of the cutting/shaping surfaces arranged in a side-by-side relationship, so as to simultaneously produce a plurality of sandwich-sized, single-serve food condiment slices.

Figure 18:
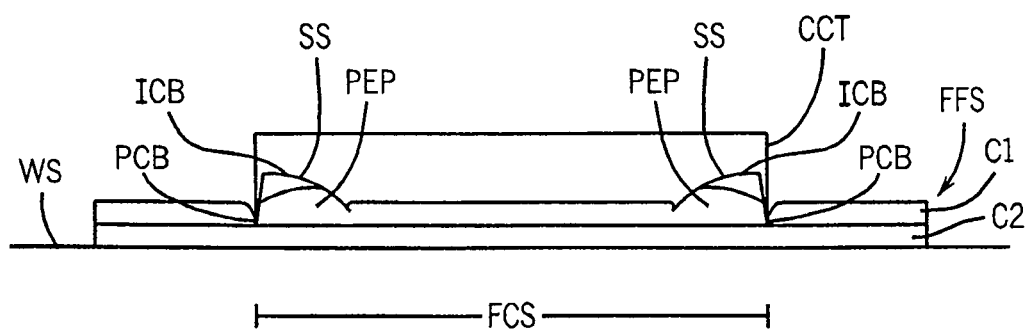
FIG. 18 is a cross-sectional view of a cutting/shaping tool used to form and shape individual face-fused food condiment slices from a face-fused food condiment sheet.

The method comprises providing a face-fused food condiment sheet on a work surface WS, as shown in FIG. 18. The face-fused food condiment sheet FFS can be formed by methods previously discussed. The individual food condiments are indicated by C1 and C2. The face-fused food condiment sheet FFS is divided using the cutting/compression tool CCT by contacting the face-fused food condiment sheet FFS with the cutting/compression tool CCT, as shown in FIG. 18. The cutting/compression tool CCT is pressed against the face-fused food condiment sheet FFS such that the peripheral cutting blades PCB penetrate and cut through the face-fused food condiment sheet FFS. The peripheral edge portions PEP are then contacted by the heated compression or shaping surface SS which is formed from an inner cutting blade ICB and adjacent to a peripheral cutting blade PCB and formed under the inner cutting blades ICB such that the peripheral or edge portions PEP of the face-fused food condiment slice are made to flow and are shaped by the heated shaping surface SS. After the cutting and shaping operation, the cutting/compression tool CCT is withdrawn leaving a formed sandwich-sized, single-serve, face-fused, combination food condiment slice FCS. A decorative design, crimping, or border, may also be embossed into the periphery, caused by the flow and reshaping of the peripheral edge portions PEP of the food condiment slices FCS.

Figure 30:
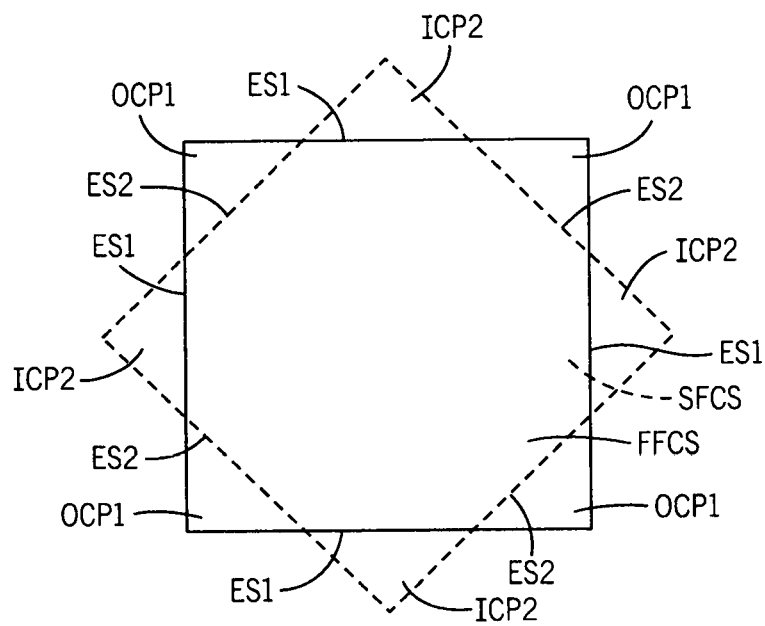
FIG. 30 is a view of a sandwich-sized, face-fused food condiment slice wherein the corner portions are bent or folded over the edge or side portions of a second food condiment slice.
Figure 31:
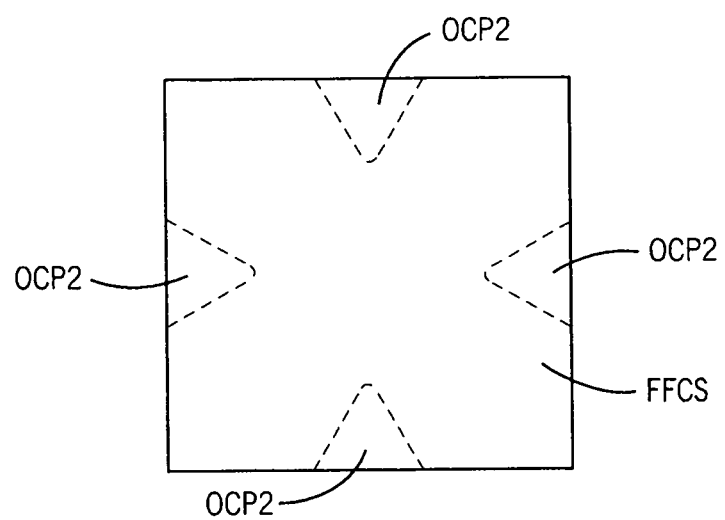
FIG. 31 is a view of FIG. 30 wherein the corner portions of the second food condiment slice are likewise bent or folded over the first food condiment slice.
Figure 32:
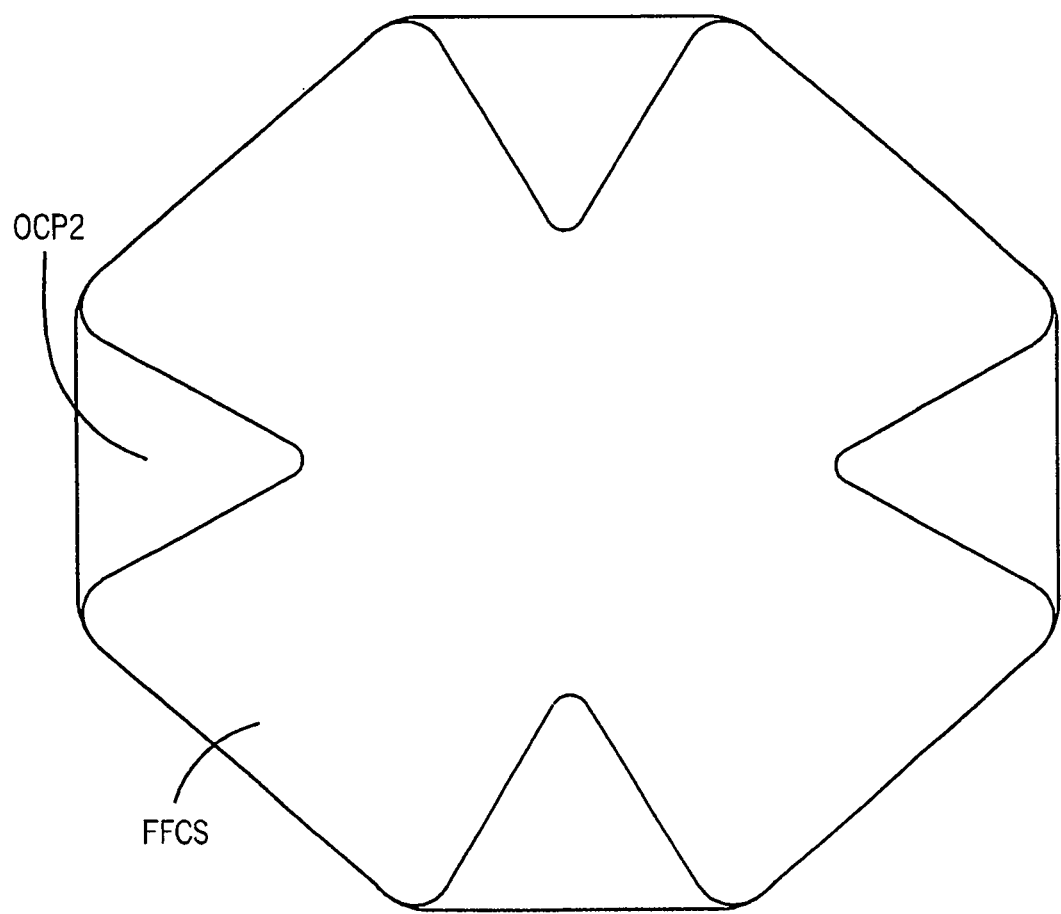
FIG. 32 is a view of the fused condiment slice of FIGS. 30 and 31.

A further alternative of the second embodiment is to bond or fuse a first food condiment slice to a second food condiment slice by performing the bonding in an area of the face-to-face food condiment slices other than the peripheral edges. This process involves heating an area of the inner face of the food condiment slices to the flow point of at least one of the food condiments on its face surface that is to be contacted with the second food condiment slice. Then, contacting the inner face surfaces such that the inner face surfaces fuse and bond forming a face-fused, sandwich-sized, single-serve, combination food condiment slice. Face-fusion of the food condiment slices also allows orientation and fusion of the food condiment slices as shown in FIGS. 30, 31, and 32. In this face-fused food condiment slice, first and second inner face surfaces of the sandwich-sized, single-serve, food condiment slices FFCS and SFCS are oriented to each other, at an angle, as shown in FIG. 30. The solid line food condiment slice is in front and is referred to as the first food condiment. Note that the corner portions of the first food condiment slice CP1 and the second food condiment slice CP2 are off-set from each other and one or both of the food condiment slices FFCS or SFCS has been rotated or turned through an angle. Note from FIG. 30 that the corner portions of the first food condiment slice FFCS are showing the outer face surfaces of the corner portions OCP1. Likewise, the corner portions of the second food condiment slice SFCS are showing the inner face surfaces of the corner portions ICP2. The planes of the inner face surfaces are in a face-to-face relationship. Upon fusion of the inner face surfaces, the corner portions CP1 and CP2 of each food condiment slice are folded over the edge surfaces ES1 and ES2 of the mating food condiment. Note that the inner face surfaces of the corner portions ICP2 of the second food condiment slice SFCS are fused to the outer face surface of the first food condiment slice FFCS. In FIG. 31, the inner face surfaces of the corner portions ICP2 of the second food condiment slice SFCS are bent or folded over the adjacent sides or edges ES1 of the first food condiment slice FFCS and are fused to the outer face surface of the first food condiment slice FFCS. FIG. 31 shows the outer surfaces of the folded over and fused corner portions OCP2 of the second food condiment slice SFCS. Likewise, the inner face surfaces of the corner portions CP1 of the first food condiment slice FFCS are bent or folded over the adjacent sides or edges ES2 of the second food condiment slice SFCS and are fused to the outer face surface of the second food condiment slice SFCS. FIG. 32 shows the final face-fused food condiment slice.

Figure 19:
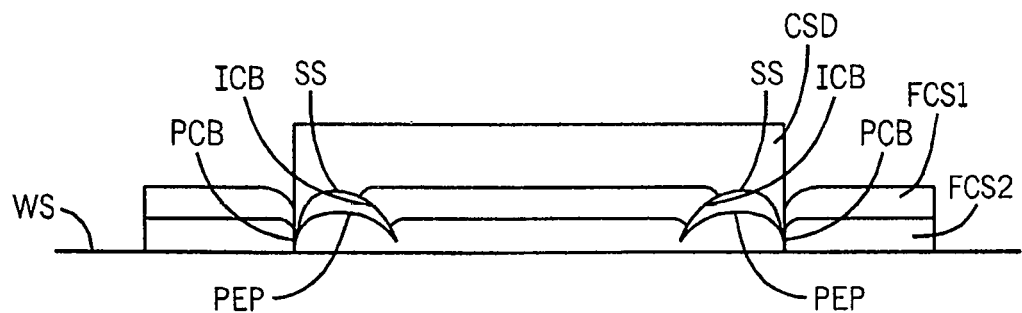
FIG. 19 is a cross-sectional view of a cutting/shaping tool used to form and shape face-to-face food condiment sheets into individual face-fused food condiment slices by fusing the peripheral side portions during the cutting and shaping operations.

A fourth method for fusing two separate food condiment sheets involves the steps of mating a face surface of a first food condiment sheet with a face surface of a second food condiment sheet that has been positioned on a work surface. Next, the mating edge portions of the two mating face-to-face food condiment sheets are restrained, as by friction between the two mating surfaces of the food condiment sheets, or by holding devices, clamps, rollers, or any other desired means, at the edge portions of the mating food condiment sheets or face portions, if necessary, such that the opposing food condiment sheets do not substantially shift or move from their face-to-face relationship. Next, at least one cutting/shaping device CSD, as shown in FIG. 19, is contacted with the outer face surface of the food condiment sheet FCS1. The cutting/shaping device CSD is heated at its peripheral edge shaping surface SS and its inner cutting blade ICB and peripheral cutting blade PCB to the flow temperature of at least the first food condiment FCS1 or the second food condiment FCS2. The cutting/shaping device CSD is contacted with the outer surface of exposed food condiment sheet FCS1. The cutting/shaping device CSD compresses and heats at least the food condiment sheet FCS1 in the area adjacent to or in contact with the compression-shaping surface SS and the inner cutting blades ICB and the peripheral cutting blades PCB of the cutting/shaping device CSD. The cutting blades, being also heated, causes flowing of the food condiments adjacent and in contact with the heated cutting blades ICB and PCB causing fusion and bonding of the first and second food condiments FCS1 and FCS2. The shaping surface SS causes at least the contacted food condiment FCS1 and FCS2 to soften and flow in the area of contact. The first and second food condiments FCS1 and FCS2 then fuse and bond as a result of the heat and compression. This step cuts and forms a sandwich-sized, single-serve, face-fused combination food condiment slice from the two mating face-to-face food condiment sheets FCS1 and FCS2 by cutting through the two mating face-to-face food condiment sheets FCS1 and FCS2 to form face-to-face sandwich-sized, single-serve, food condiment slices and bonding the peripheral edge portions PEP of the formed sandwich-sized, single-serve, food condiment slices together by compression heat molding of the peripheral edge portions PEP adjacent the cut. A decorative design, crimping, or border, may also be embossed into the periphery, caused by the flow and reshaping of the peripheral edge portions PEP of the food condiment slices. This can also be accomplished in an additional or completely separate area if so desired, of the sandwich-sized, single-serve, face fused combination food condiment slice during the cutting, heating, and compression step.

A fifth method for fusing two separate food condiments to form a face-fused combination food condiment slice can be performed using a molding process such as extrusion molding, injection molding, pouring or any other molding process that will accomplish the objective of forming face fused combination food condiment slices. This process produces individual sandwich-sized, single-serve, face-fused, combination food condiment slices. The process uses a plurality of molds having the shape of the desired sandwich-sized, single-serve, food condiment slice. A predetermined quantity of a first food condiment is injected, poured, or extruded into the mold. The mold may be heated or cooled or be at room temperature depending on the process and the food condiment being molded. After a predetermined time, a predetermined quantity of a second food condiment is injected, poured, or extruded into the mold and over the upper surface of the first food condiment injected, poured, or extruded into the mold. The temperature of the second injected, poured, or extruded food condiment or the first injected, poured, or extruded food condiment, or both, causes bonding of the two food condiments at their mating face surfaces. The mating face surfaces can be the entire face surfaces of the food condiments, or a portion thereof. It is noted that face-fused combination food condiment sheets can also be formed by this method. If face-fused combination food condiment sheets are formed rather than slices, the face-fused, food condiment sheets are subsequently divided, by a cutting operation, into strip sheets, and finally into sandwich-sized, single-serve, food condiment slices, as previously described and shown by the cutting operations in FIGS. 3 and 4. Alternatively, the face-fused, combination food condiment sheet formed by the above-described molding method can also be divided using the cutting/shaping device by the operation described previously.

Figure 20:
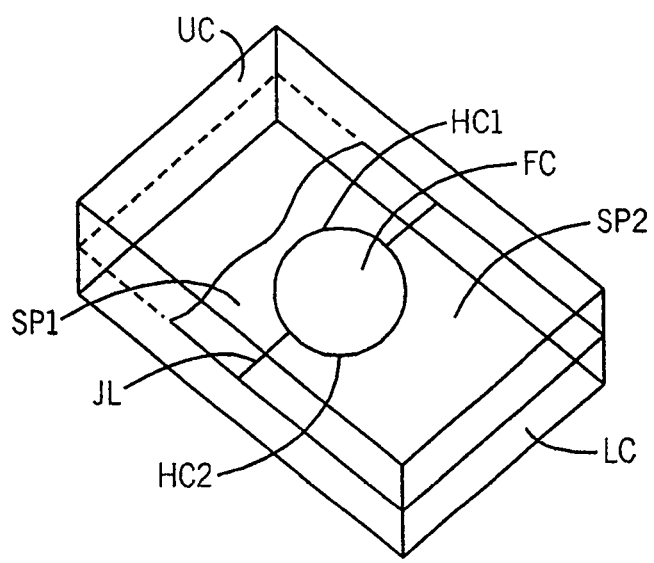
FIG. 20 is a top view of a mold used for full face-fusion and partial face-fusion of food condiment slices.

A mold that can be used for full face-fusion and for partial face-fusion of the two food condiments is shown in FIG. 20. The mold has a lower compartment LC and an upper compartment UC. The upper compartment UC and the lower compartment LC are demarcated by the dotted line. Two separating plates SP1 and SP2 fit on a lip portion formed on the inner molding surface at the demarcation line. Each separating plate has a half-circle cutout. SP1 is shown as a cut-away plate so as to reveal the lower compartment LC. The two separating plates SP1 and SP2 fit together at a joining line JL such that the half circle cut-outs HC1 and HC2 fit together to form a full circle cutout FC. The method involves filling the lower compartment LC of the mold by the previously mentioned methods through the full circle cutout FC. The lower compartment is filled completely with a predetermined quantity of a first condiment C1. After a predetermined period of time, a second food condiment is distributed into the upper compartment UC of the mold. The upper compartment UC is connected to the lower compartment only by way of the full circle cutout FC. Therefore, fusion of the two food condiments occurs only within the full circle cutout FC. After a predetermined time, the separating plate SP1 and SP2 are separated and removed, and the resulting sandwich-sized, single-serve, face-fused combination food condiment slice is removed from the mold.

Figure 11:
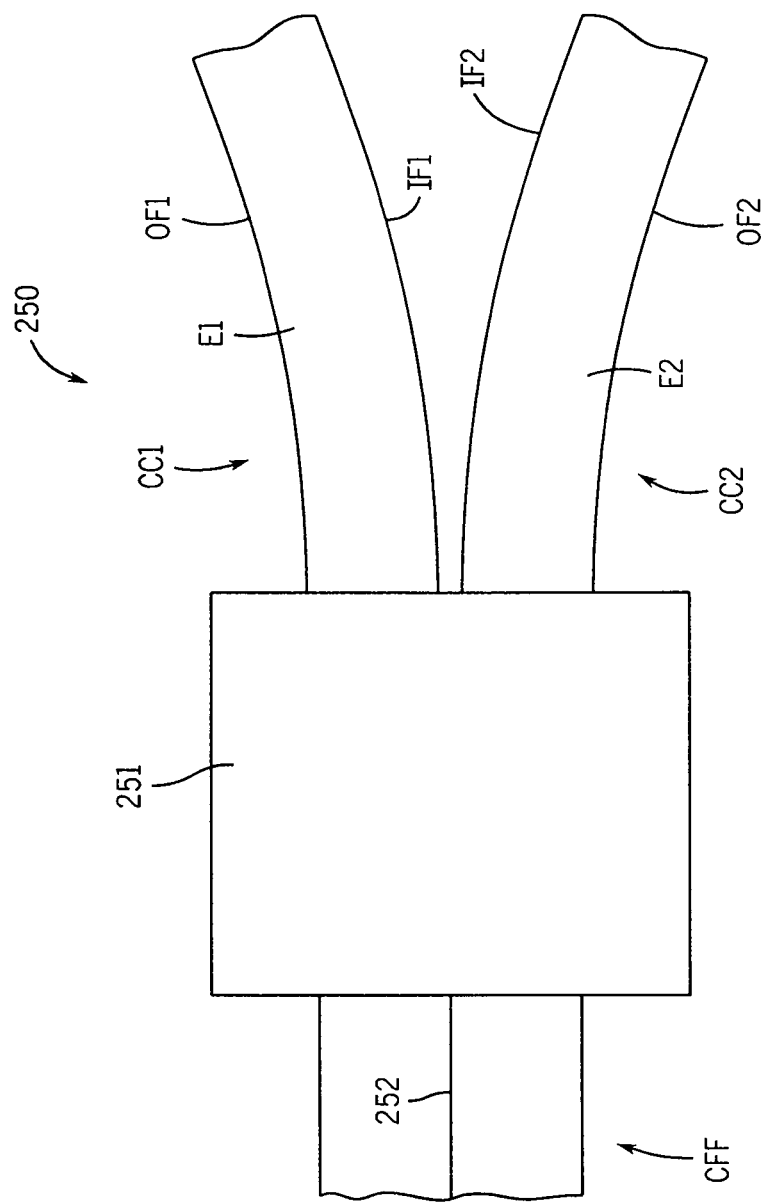
FIG. 11 is a side view of a continuous face-to-face fusion process for two individual continuous food condiment sheets.

A sixth method for fusing two separate food condiments to form a face-fused combination food condiment slice can be performed using the continuous molding process 250, as shown in FIG. 11. First and second single food condiment sheets CC1 and CC2 are fed from a molding operation, for example, and are divided, by cutting, into rectangular strips. A first cutting operation is performed on a first continuous single food condiment sheet, such that the first cutting operation forms a first continuous food condiment rectangular strip CC1 of a desired width. The width in this description will be sandwich-sized. A second cutting operation is performed on a second continuous single food condiment sheet, such that the second cutting operation forms a second continuous food condiment rectangular strip CC2 of a desired width. The width in this example will be sandwich-sized. The first continuous food condiment rectangular strip CC1 has an outer face surface OF1, an inner face surface IF1, and a side surface E1. Likewise, the second continuous food condiment rectangular strip CC2 has an outer face surface OF2, an inner face surface IF2, and a side surface E2. The first and second continuous food condiment rectangular strips CC1 and CC2 are fed in a face-to-face relationship toward a heating/fusion device 251. The first and second continuous food condiment rectangular strips CC1 and CC2 are fed in a face-to-face relationship through the heating/fusion device 251 such that at least one of the inner face surfaces IF1 and IF2, which are the fusion surfaces, is heated to its respective flow point. The inner face surfaces IF1 and IF2 of the first and second continuous food condiment rectangular strips CC1 and CC2 are then abutted while in their flow states such that the inner face surfaces IF1 and IF2 flow, unite, and fuse together forming a continuous, face-fused, combination food condiment strip CFF emerging from the exit end of the heating/fusion device 251. The continuous, face-fused, combination food condiment strip CFF is formed from two continuous food condiment strips CC1 and CC2, which fuse forming a fusion line 252. The continuous, face-fused, combination food condiment strip CFF is then processed through a cutting operation in which the continuous, face-fused, combination food condiment strip CFF is divided perpendicular to its longitudinal axis to form sandwich-sized, single-serve, face-fused, combination food condiment slices. If the continuous, face-fused, combination food condiment strip CFF is not of sandwich-sized width, then the continuous, face-fused, combination food condiment strip CFF can be further divided to achieve this desired width. It is noted, however, that any width can be manufactured based on the end use of the food condiment slice. Once the desired width if achieved, perpendicular division to longitudinal axis can be performed to provide a desired length. The resulting sandwich-sized, single-serve, face-fused, combination food condiment slices can be formed of more than two different condiments. It is also noted that side-fused combination food condiment sheets (discussed below) can also be used as a source of continuous food condiment strips for face-fusion. Also, already face-fused strips can be further processed in subsequent face-fusion processes to provide additional condiments to a combination food condiment slice.

The face-fusion method is also used for face-fusing edible bonding sheets to a face of a food condiment sheet. The technique of face-fusing edible bonding sheets is useful in subsequent operations which use strips and/or strands or cut pieces of food condiment sheets of a single food condiment, face-fused food condiments, side-fused food condiments, or any combination thereof, for use in forming woven food condiment sheets or slices, or chopped food condiment sheets or slices. By face-fusing an edible bonding sheet to a sheet of a single food condiment, face-fused food condiment, side-fused food condiment, or any combination thereof, the strips and/or strands cut from these sheets for use in weaving woven food condiment sheets or slices, or for use in forming chopped food condiment sheets or slices would substitute for the other methods applying edible bonding materials disclosed in embodiments described hereafter.

Combination, Side-Fused, Food Condiment Slice

Figure 12A:
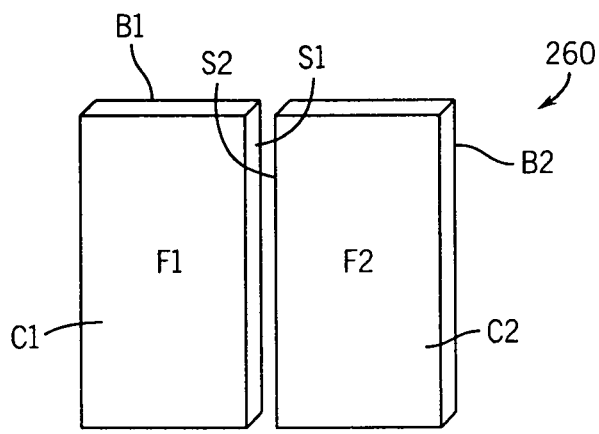
FIGS. 12a-12L are representations of side-fused food condiment slices formed from food condiment sections.
Figure 12B:
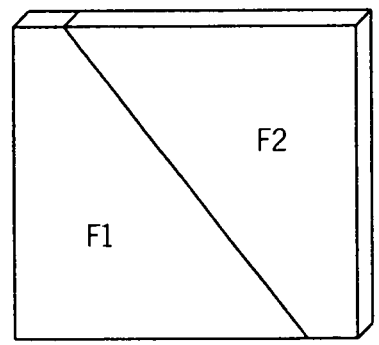
Figure 12C:
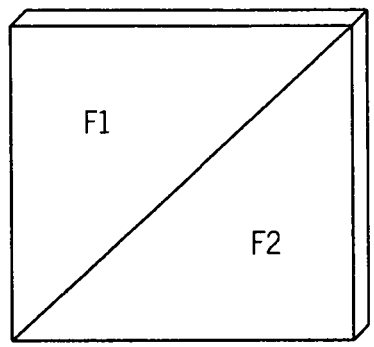
Figure 12D:
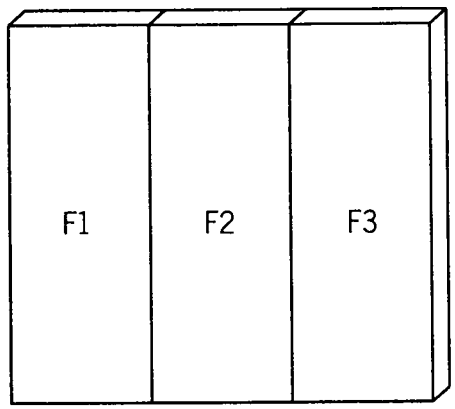
Figure 12E:
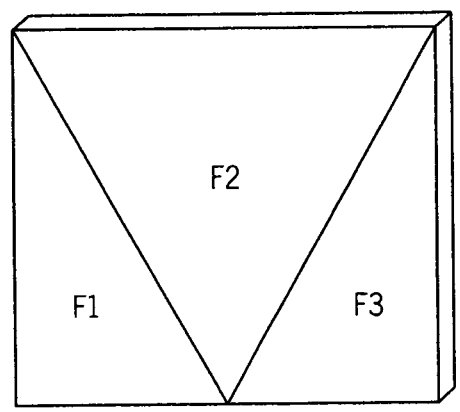
Figure 12F:
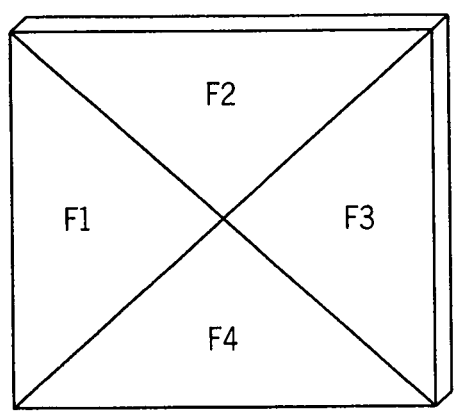
Figure 12G:
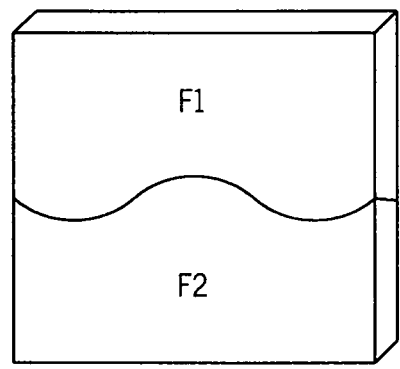
Figure 12H:
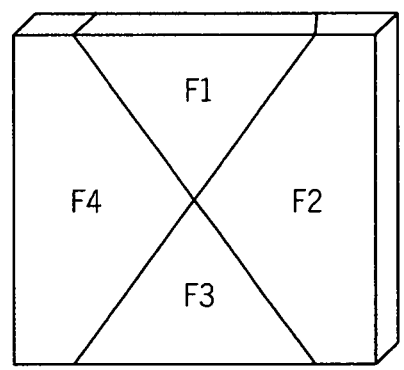
Figure 12I:
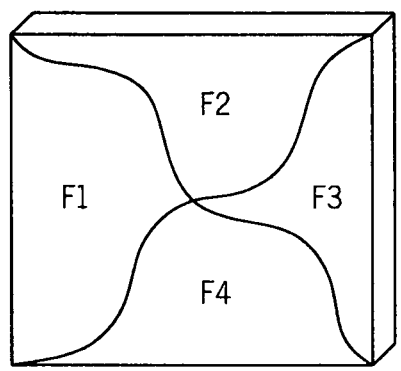
Figure 12J:
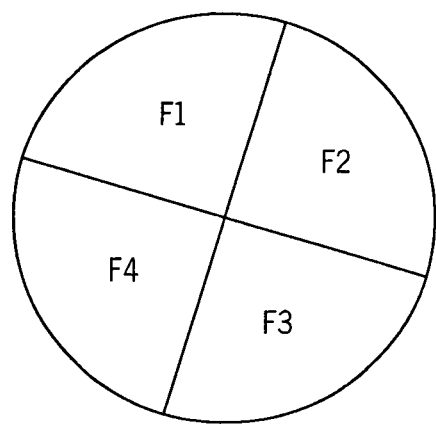
Figure 12K:
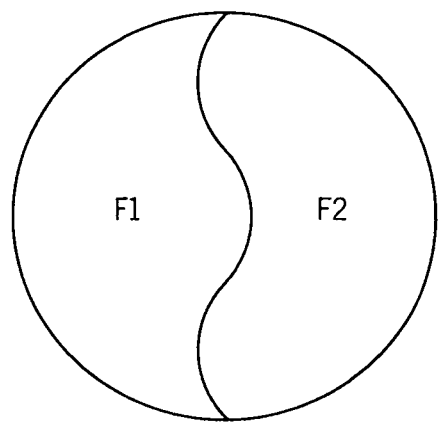
Figure 12L:
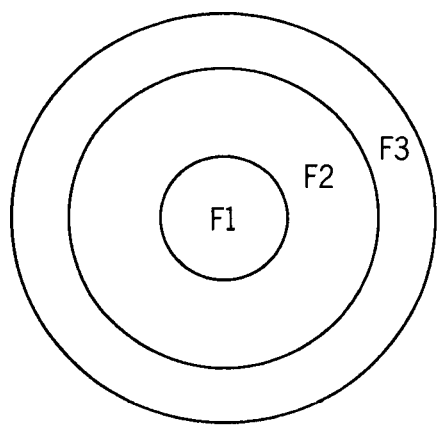

A modification of the second embodiment is to provide a sandwich-sized, singe-serve, side-fused combination food condiment comprising food condiment sections fused together at their edge or side portions or side surfaces or sidewalls to form a sandwich-sized, single-serve, side-fused combination food condiment slice, as shown in FIGS. 12*a*-12L. FIGS. 12*a*-12L depict different design features for side-fused combination food condiment slices. However, the invention is not limited to these designs and other designs are within the scope of the invention, for example, a checkerboard design. The term side-fused is used to distinguish the product from face-fused. The structure of the sandwich-sized, single-serve, side-fused combination food condiment slice, as shown in FIGS. 12*a*-12L, have food condiment sections joined together by fusion of their edge or side portions S1 and S2. The following description is made by referencing FIG. 12*a*. It is noted, however, that all of the FIGS. 12*a*-12L are relevant to the description and differ only in the shape of the food condiment sections, design of the overall combination food condiment slice, and the combination of condiments used. Each of the food condiment sections C1 and C2 has a front face surface F1 and F2 and a back face surface B1 and B2, respectively. Fusion of the food condiment sections C1 and C2 at the side walls or side portions S1 and S2 forms a side-fused food condiment slice 260 (FIG. 12*a* is not shown in the fused state, see FIGS. 12*b*-12L) having a front face surface F1+F2 and a back face surface B1+B2 originating from the front and back face surfaces, respectively, of the individual food condiment sections C1 and C2, as shown in FIG. 12*a*. Each of the food condiment sections is fused with at least a second one of said food condiment sections at their edge or side portions S1 and S2. The front face surface F1+F2 of the sandwich-sized, single serve, side-fused combination food condiment slice 260 is comprised of at least two food condiment sections C1 and C2 and at least one food condiment. The back face surface B1+B2 of the sandwich-sized, single-serve, side-fused combination food condiment slice 260 is comprised of at least two food condiment sections C1 and C2 and at least one food condiment. The first food condiment section C1 and the second food condiment section C2, of the side-fused combination food condiment slice 260, are fused together at their edge or side portions S1 and S2, respectively. Fusion of the edge or side portions S1 and S2 of the first and second food condiment sections C1 and C2 forms a side-fused combination food condiment slice 260. The side fused combination food condiment slice 260 has a front face surface F1+F2 comprising at least two food condiment sections having front faces F1 and F2 and a back face surface B1+B2 comprising at least two food condiment sections having back faces B1 and B2. FIGS. 12*h*, 12*i*, 12*j*, and 12L, are formed of more than two food condiment sections. Accordingly, the sections are labeled F1, F2, F3, F4, and so on. The side-fused combination food condiment slice may have one or more food condiments making up the side-fused combination food condiment structure, if so desired. Side fusing two separate food condiment sections C1 and C2 to form a side-fused combination food condiment slice 260 can be accomplished by initially forming two separate food condiment sheets, each of which can be formed by the molding methods previously disclosed in the first embodiment of the instant invention and hereby incorporated in this discussion. Also, face-fused combination food condiment sheets can be used in this modification and are formed by the molding methods previously disclosed in the second embodiment of this invention drawn to forming face-fused combination food condiment sheets, and is hereby incorporated in this discussion. After formation of the single food condiment sheets, a cutting operation is performed to divide the single food condiment sheets into a plurality of food condiment sections having desired shapes, such as the food condiment sections shown in FIGS. 12*a* through 12L. The food condiment sections of one single food condiment sheet are matched and joined at their side surfaces to condiment sections formed from a second single food condiment sheet. It is noted that more than two food condiment sections can be used to form a food condiment slice. The number of food condiment sections used depends on the shapes of the food condiment sections and the number of food condiment sections of a particular food condiment desired in a food condiment slice.

Figure 13:
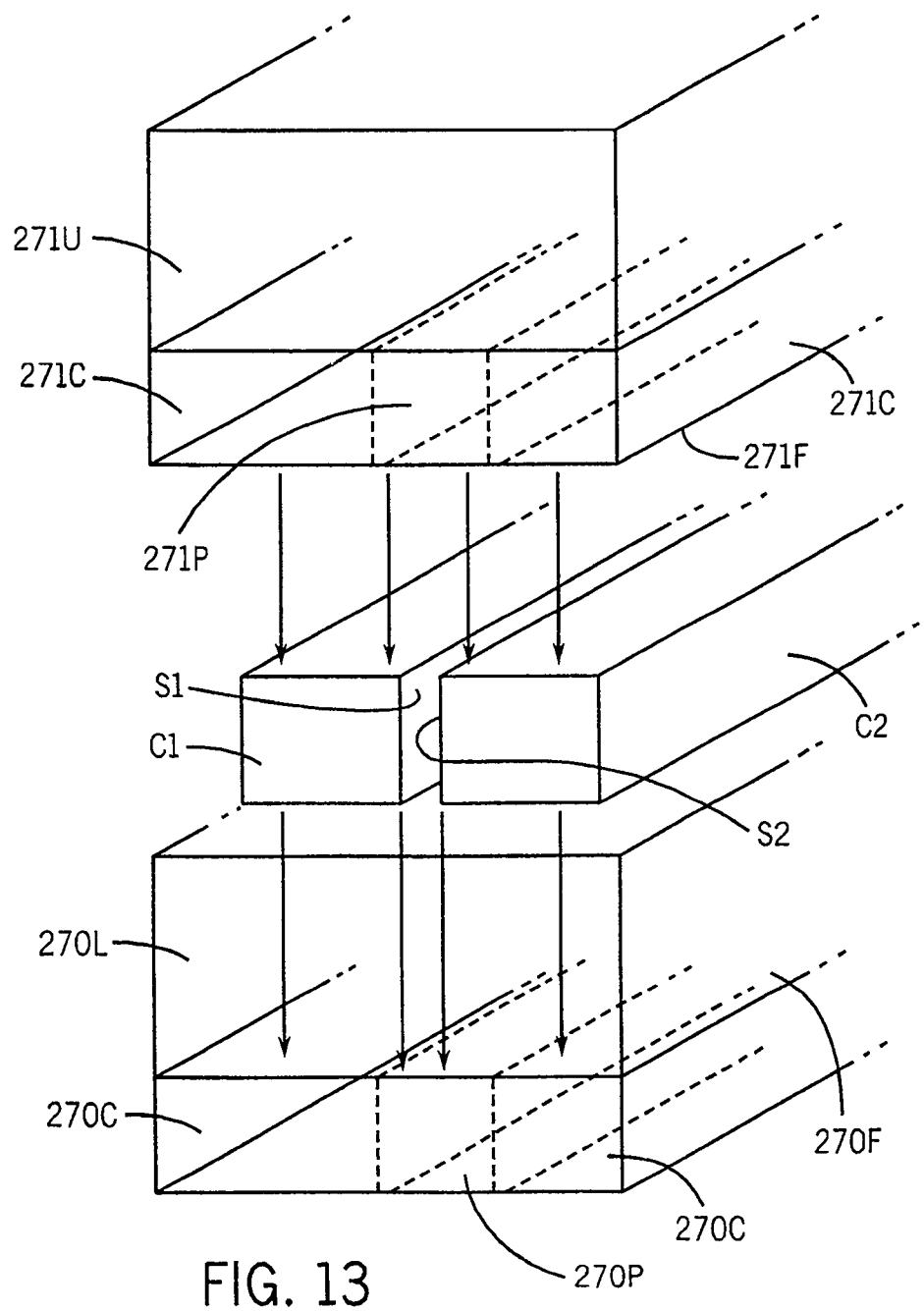
FIG. 13 is a view of a side-fusion process of two food condiment sections performed in a mold.

In order to fuse the two food condiment sections C1 and C2, the two food condiment sections C1 and C2 are positioned in a lower mold cavity 270L having the final shape of a sandwich-sized, single-serve, food condiment slice, as shown in FIG. 13. The lower mold cavity 270L has a heating/cooling plate 270P which runs along the floor 270F of the lower mold cavity 270L. The heating/cooling plate 270P is positioned below and parallel to or in concert with the fusion line formed by the mating of the side surfaces S1 and S2 of the food condiment sections C1 and C2. The sides S1 and S2 of the food condiments sections C1 and C2, being fused, are positioned over and run parallel to or in concert with the heating/cooling plate 270P of the lower mold cavity 270L. It is important that the food condiment sections C1 and C2 be positioned in the lower mold cavity 270L with the correct orientation such that the side surfaces S1 and S2 being fused are positioned over and run parallel with or in concert with the heating/cooling plate 270P. Note from FIG. 13 that the side surfaces S1 and S2 being fused overlie the heating/cooling plate 270P, as indicated by the arrows, when positioned in the lower mold cavity 270L. The side surfaces S1 and S2 being fused are in a face-to-face abutting relationship. Cooling or insulating plates 270C are adjacent to the heating/cooling plate 270P and form the remaining portions of the floor of the lower mold cavity 270L. The cooling or insulation plates 270C protect the remaining portion of the food condiment sections C1 and C2 not in contact with the heating/cooling plate 270P from being heated. The food condiment sections C1 and C2 can be maintained in position within the mold cavity by use of vacuum, if so desired. An upper mold section 271U mates with the lower mold section 270L holding the food condiment sections C1 and C2. The upper mold section 271U has a heating/cooling plate 271P running along its floor 271F above and parallel to or in concert with the fusion line formed by the mating side surfaces S1 and S2 of the food condiment sections C1 and C2. The upper mold section 271U also has cooling or insulating plates 271C adjacent to the heating/cooling plate 271P to protect the remaining portions of the food condiment sections C1 and C2 not in contact with the heating/cooling plate 271P from being heated. After the upper mold section 271U is positioned on the upper surfaces of the abutting food condiments sections C1 and C2, the heating/cooling plates 271P and 270P, in the upper mold section 271U and the lower mold section 270L, respectively, are heated to cause the side surfaces S1 and S2 of the abutting food condiments sections C1 and C2 to flow, unite, and fuse together. The fusion of the food condiment sections C1 and C2 forms a sandwich-sized, single serve, side-fused, combination food condiment slice. The food condiment section C1 of a first food condiment and the food condiment section C2 of a second food condiment are paired or matched and fused at their side surfaces S1 and S2 such that a sandwich-sized, single-serve, side-fused, combination food condiment slice is formed.

Figure 14:
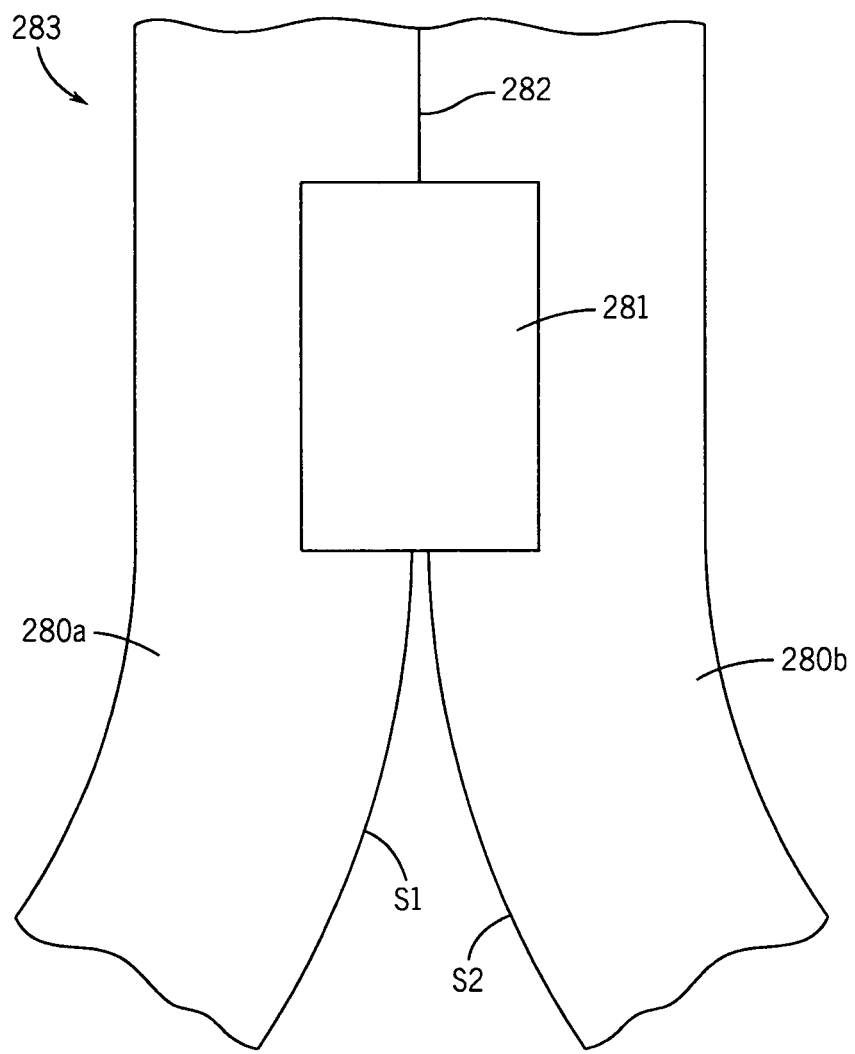
FIG. 14 is a top view of a continuous side-fusion process for two individual continuous food condiment sheets.

A second method for fusing two separate food condiments to form a side-fused combination food condiment slice can be performed using a continuous molding process as shown in FIG. 14. First and second single food condiment sheets originating from a molding process, for example, can be divided, by cutting, into rectangular strips. The first cutting operation can be performed on a first continuous food condiment sheet such that the first cutting operation forms a first continuous food condiment rectangular strip 280a of a desired width. The width used in this description is sandwich-sized, although other widths are allowed. A second cutting operation is performed on a second continuous food condiment sheet such that the second cutting operation forms a continuous food condiment rectangular strip 280b, having a desired width. The first continuous food condiment rectangular strip 280a is then mated with second continuous food condiment rectangular strip 280b in a side-by-side relationship. The first and second continuous food condiment rectangular strips 280a and 280b are fed in a side-by-side relationship to a heating/fusion device 281 such that at least one of the of the side walls or side portions S1 and S2, which form the fusion line 282, of the first and second food condiments strips 280a and 280b is heated to its respective flow point. Heating/fusion device 281 extends above and below, or on both sides of the plane of, the food condiment strips 280a and 280b. The heating/fusion device 281 has wall slits running parallel to the plane of the food condiment strips such that the outer peripheral edges of the food condiment strips may pass therethrough. The inner side walls or side portions S1 and S2 of the first and second continuous food condiment rectangular strips 280a and 280b are then abutted while in their flow state such that the side walls or side portions S1 and S2 flow, unite, and fuse together forming a continuous, side-fused, combination food condiment strip 283 emerging from the exit end of the heating/fusion device. The continuous, side-fused, combination food condiment strip 283 is formed from two food condiment strips 280a and 280b. The continuous, side-fused, combination food condiment strip 283 is then processed through a cutting operation in which the continuous, side-fused, combination food condiment sheet 283 is divided perpendicular to its longitudinal axis to form sandwich-sized, single-serve, side-fused, combination food condiment slices. The resulting sandwich-sized, single-serve, side-fused, combination food condiment slices can be formed of more than two different condiments and be formed of more than two food condiment strips. If the resulting continuous, side-fused, combination food condiment strip 283 is not of sandwich-sized width, then the continuous, side-fused, combination food condiment strip 283 can be further divided to achieve this desired width. It is noted, however, that any desired width can be manufactured. Once the desired width is achieved, perpendicular division to the longitudinal axis can be performed to provide a desired length for the resulting food condiment slices. It is also noted that face-fused combination food condiment sheets can also be used as a source of continuous food condiment strips. The same method can be used as discussed above for forming sandwich-sized, single-serve, side-fused, combination food condiment slices.

Another method of forming side-fusion food condiment slices involves an alternative extrusion and cutting method. The side-fused structures displayed in FIGS. 12a-12L, can be formed through this alternative extrusion process. The extrusion apparatus is provided with extrusion nozzles with the desired shape through which food condiment compositions are extruded. To enhance fusion and bonding of the extruded food condiment materials, the exit portion of the extrusion nozzles may be heated to the flow point of the extruded condiments. As the heated surfaces of the extruded condiments contact, adhesion and bonding occur to attach the individual extruded food condiments together at their longitudinal side surfaces, thereby forming a food condiment loaf Following extrusion, the formed food condiment loaf is divided into slices or discs, as by cutting. Any number of extrusion nozzles, types of condiments, and extruded condiment shape can be used.

Woven Food Condiment Slice

Figure 21:
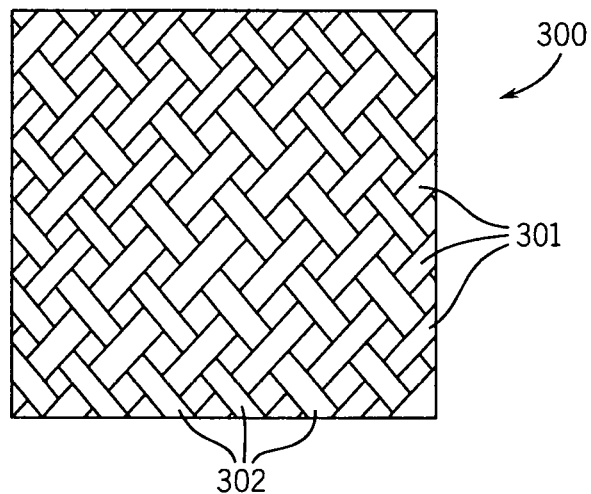
FIG. 21 is a perspective view of a woven single-sliced condiment having a square or rectangular shape. Interweaving of the single condiment strands and/or strips form a singe-slice woven condiment.
Figure 22:
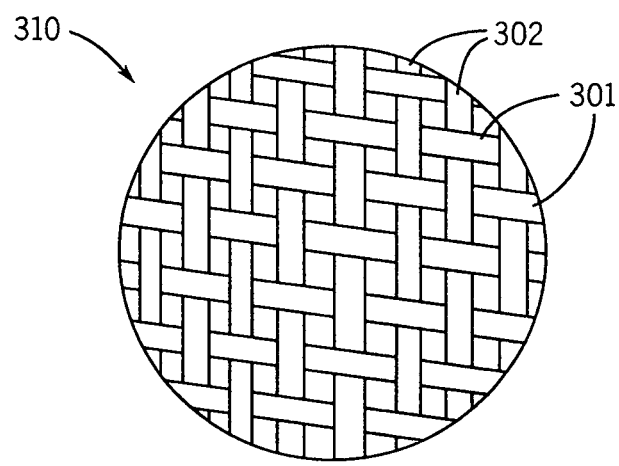
FIG. 22 is a perspective view of a woven single-sliced condiment having a circular shape. Interweaving of the single condiment strands and/or strips form a singe-slice woven condiment.

A third embodiment of the instant invention is to provide a sandwich-sized, single-serve, woven food condiment slice 300 and 310, as shown in FIGS. 21 and 22. The sandwich-sized, single-serve, woven food condiment slices 300 and 310, are formed by weaving strips and/or strands 301 with strips and/or strands 302. Strips and/or strands 301 and 302 are formed from at least one food condiment.

Figure 23:
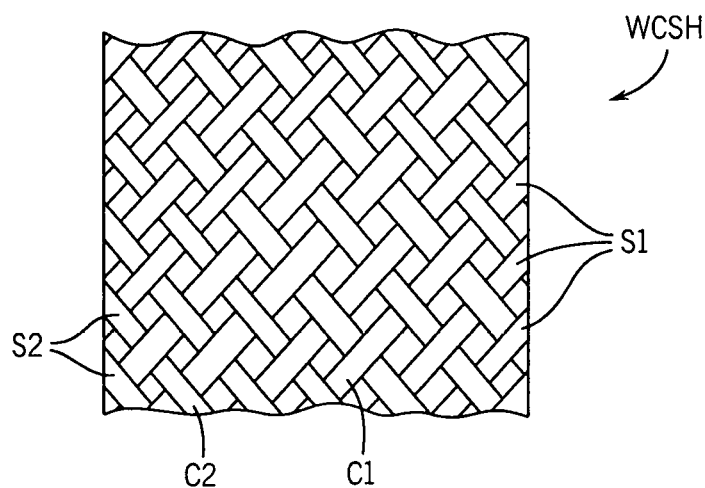
FIG. 23 is a top view of a woven food condiment sheet.

The face-fusion method is also used for face-fusing edible bonding sheets to a face of a food condiment sheet. The technique of face-fusing edible bonding sheets is useful in subsequent operations which use strips and/or strands or cut pieces of food condiment sheets of a single food condiment, face-fused food condiments, side-fused food condiments, or any combination thereof, for use in forming woven food condiment sheets or slices, or chopped food condiment sheets or slices. By face-fusing an edible bonding sheet to a sheet of a single food condiment, face-fused food condiment, side-fused food condiment, or any combination thereof, the strips and/or strands cut from these sheets for use in weaving woven food condiment sheets or slices, or for use in forming chopped food condiment sheets or slices would substitute for the other methods applying edible bonding materials disclosed in embodiments described hereafter. The food condiment slices 300 and 310 can be formed by different methods. In a first method, woven food condiment sheet WCSH, as shown in FIG. 23, can be manufactured by weaving strips and/or strands S1 and S2 of a desired food condiment that have been cut from a food condiment sheet formed from a single food condiment. The food condiment sheet of a single food condiment can be formed by extrusion molding, thin film molding, injection molding, compression molding, or any other process or combination of processes, which will accomplish the objective of forming food condiment sheets. Following formation of the food condiment sheets, strips and/or strands S1 and S2 of food condiment can be cut from the food condiment sheets using a cutting operation. The strips and/or strands S1 and S2 are then interwoven to form a woven food condiment sheet WCSH. The woven food condiment sheet WCSH comprises one or more food condiments C1 and C2. As indicated before, condiment C1 can be the same condiment as condiment C2. Strips and/or strands S1 and S2 originating from one or more food condiment sheets, which may or may not be the same food condiment, are woven together at any desired angle to each other. In a particular structure and design for woven food condiment sheet WCSH, strips and/or strands S1 of a first food condiment can be placed parallel or at any angle to each other. A second food condiment in the form of strips and/or strands S2, which may be the same or different from the first food condiment, can then be interwoven with the first food condiment strips and/or strands S1. Any desired angle can exist between the S2 strips and/or strands and also between the S1 and S2 strips and/or strands. Any desired pattern of weaving can be used and any desired angle can be used. When a constant size, width, length, or thickness, for example, of strands and/or strips S1 and S2 is used in weaving the food condiment sheet WCSH, the degree of tightness, packing, or closeness of the strands and/or strips S1 and S2 in a given direction or angle depends on the amounts of the first and second food condiments C1 and C2 desired. The size, shape or thickness of the strands and/or strips S1 and S2 can also be varied in conjunction with the degree of tightness, packing, or closeness of the strands and/or strips S1 and S2 in the weaving to determine the number of strands and/or strips S1 and S2 of each food condiment C1 and C2 to be used in the weaving to obtain the desired amount of each food condiment C1 and C2 for the resulting sandwich-sized, single-serve, woven food condiment slice.

Figure 24:
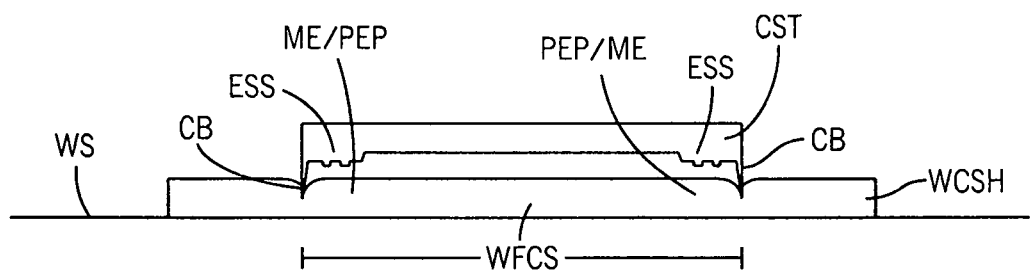
FIG. 24 is a cross-sectional view of a cutting/shaping tool used to form and shape individual food condiment slices from a food condiment sheet.

The weaving operation can be performed by initially cutting strips and/or strands S1 from a first food condiment sheet and strips and/or strands S2 from a second food condiment sheet. The first food condiment strips and/or strands S1 are positioned on a work surface at the desired angle and degree of packing. Strips and/or strands S2 are interwoven, at a desired angle and degree of packing, with the first food condiment strips and/or strands S1 positioned on the work surface. It is noted that the first food condiment C1 and the second food condiment C2 can be the same food condiment. The weaving step forms a woven combination food condiment sheet WCSH. After the weaving step has been completed, a cutting operation is performed on the woven combination food condiment sheet WCSH to divide the woven combination food condiment sheet WCSH to produce sandwich-sized, single-serve, woven combination food condiment slices 300 and 310, as shown in FIGS. 21 and 22. The sandwich-sized, single-serve, woven combination food condiment slices 300 and 310 formed by the cutting operation can be of any desired geometrical shape; such as square, rectangular, circular, triangular, oval, etc. The cutting operation is performed using a cutting/shaping tool CST having cutting blades CB, as shown in FIG. 24. The blades can be heated or non-heated. The cutting/shaping tool CST may also have a plurality of the cutting blades CB arranged in a side-by-side relationship so as to simultaneously produce a plurality of sandwich-sized, single-serve, woven combination food condiment slices WFCS.

The method comprises using the cutting/shaping tool CST, as shown in FIG. 24, to divide the woven food condiment WCSH, shown in FIG. 23, by contacting the woven food condiment sheet WCSH with the cutting/shaping tool CST. The cutting/shaping tool CST is pressed against the woven food condiment sheet WCSH such that the cutting blades CB penetrate and cut through the woven combination food condiment sheet WCSH. The peripheral edge portions PEP are subsequently contacted by the compression or embossing shaping surface ESS adjacent the cutting blades CB such that the woven peripheral edge portions PEP of the formed woven combination food condiment slice WFCS are made to bond, tie, merge, or join together the margin ends ME of the overlapping strands and/or strips S1 and S2, of FIG. 23, of the peripheral edge portions PEP of the woven food condiment slice WFCS. This ensures that the formed sandwich-sized, single-serve, woven combination food condiment slice WFCS is retained in the woven form. This cutting and shaping operation forms a sandwich-sized, single-serve, woven combination food condiment slice WFCS. The tool can also be heated, if desired, to a temperature which will allow at least one of the first food condiment C1 or the second food condiment C2 to flow and bond to at least one of the first food condiment C1 or the second food condiment C2. The compression tool used for the compression operation may be combined with the cutting tool such that both the cutting and compression operations can be performed together, as shown in FIG. 24. A decorative design or border may also be embossed into the periphery of the woven combination food condiment slice WFCS during the compression step using a cutting/embossing tool such as that shown in FIG. 24. Subsequent to the cutting and shaping operations, the cutting/shaping tool CST is withdrawn from the woven combination food condiment sheet WCSH. The formed sandwich-sized, single-serve, combination, food condiment slice WFCS is removed from the food condiment sheet WCSH and the operation is repeated, if desired. If the cutting/shaping tool CST used has a plurality of the cutting/shaping surfaces, the plurality of the formed sandwich-sized, single-serve, woven combination food condiment slices WFCS are removed from the woven combination food condiment sheet WCSH.

Woven Food Condiment Slice with Edible Edge Sealer

Figure 25:
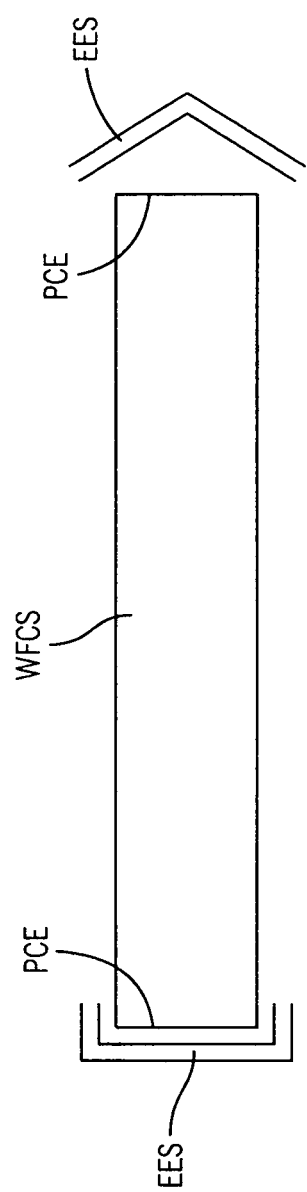
FIG. 25 is a cross-sectional view of an edible edge sealer being applied to the edge portions of a woven combination food condiment slice.
Figure 26:
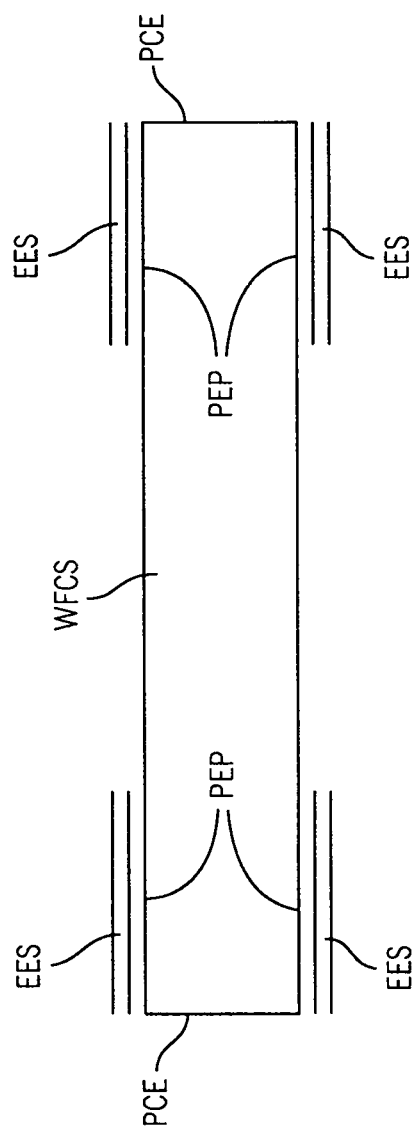
FIG. 26 is a cross-sectional view when an alternative edible edge sealer is applied to the top periphery, bottom periphery, or both.

An additional modification to heating and compressing the peripheral edge portions PEP with a compression/shaping surface SS is to use a preformed edible edge sealer EES, as shown in FIG. 25. The edible edge sealer EES may be applied and heat sealed to the peripheral cut edges PCE of the woven combination food condiment slice WFCS to retain the woven combination food condiment slice WFCS in its woven form by preheating the edible edge sealer EES to its flow temperature, applying the preheated softened edible edge sealer EES to the peripheral cut edges PCE of the woven food condiment slice WFCS, and pressing the preheated softened edible edge sealer EES to cause it to flow into the interstices of the peripheral cut edges PCE of the woven food condiment strips and/or strands S1 and S2 of the woven combination food condiment slice WFCS to bond the edible edge sealer EES to the peripheral cut edges PCE of the woven combination food condiment slice WFCS to thereby retain the weaving pattern given to the woven combination food condiment slice WFCS. Alternatively, the edible edge sealer can be applied first and then heated. The edible edge sealer EES can be manufactured with different shapes. Examples of two such shapes, squared and angled, are shown in FIG. 25. Additionally, the edible edge sealer can be applied to the peripheral cut edges without first preheating. The heating and softening step can occur with a compression/heating tool (not shown). It is also noted that the edible edge sealer may be applied to the peripheral edge portion PEP of the upper surface, lower surface, or both, as shown in FIG. 26. Also, the edible edge sealer EES can be formed from a food condiment used in the woven food condiment slice WFCS.

Figure 27:
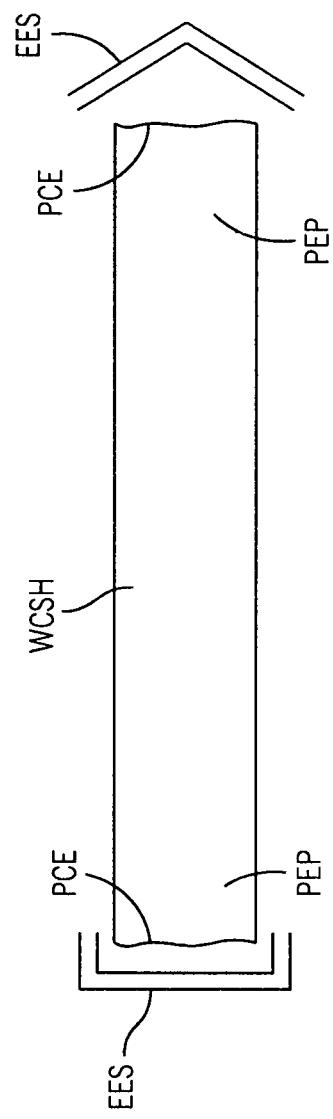
FIG. 27 is a cross-sectional view of an edible edge sealer being applied to the edge portions of a woven combination food condiment sheet.

To accomplish the sealing operation using an edible edge sealer EES for a woven combination food condiment sheet, as shown in FIG. 27, an edible edge sealer EES material having the shape of the outer edges or periphery of the woven combination food condiment sheet WCSH is applied to the peripheral cut edges PCE of the woven food condiment sheet WCSH to envelope the periphery and cut edges of the woven food condiment sheet WCSH. Next, heat sealing the peripheral cut edges PCE and peripheral edge portion PEP of the woven food condiment sheet WCSH is accomplished using a compression/heating tool (not shown) to compress and heat the preformed edible edge sealer EES material to its flow temperature such that the preformed edible edge sealer EES material softens and flows into and around the interstices of the woven peripheral cut edges PCE and peripheral edge portions PEP of the woven food condiment sheet WCSH to bond the molten edible edge sealer EES to the peripheral cut edges PCE and peripheral edge portions PEP of the woven food condiment sheet WCSH to thereby retain the weaving pattern given to the woven food condiment sheet WCSH. The method also acts to retain the relative positioning of the woven food condiment sheets for subsequent operations. As an alternative, an edible edge sealant material EES having the shape of the outer periphery of the woven food condiment sheet WCSH, is made to overlie the peripheral edge portion PEP of the woven food condiment sheet WCSH, like that shown in FIG. 26.

Figure 29:
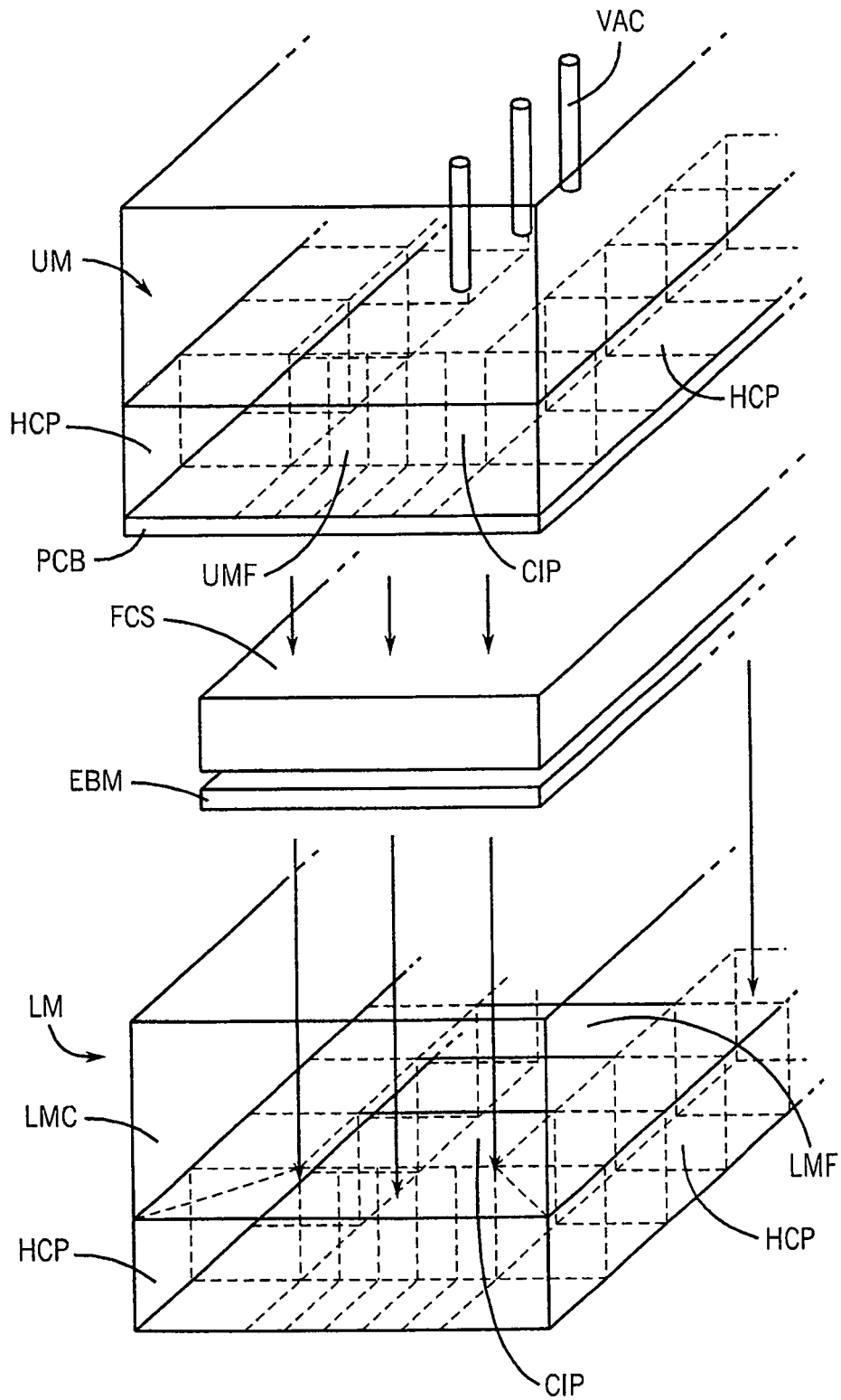
FIG. 29 is a view of a fusion process of an edible bonding material and a woven food condiment slice performed in a mold.

An alternative method for edge sealing the individual woven food condiment slices involves performing a cutting operation on a woven food condiment sheet to form a sandwich-sized, single-serve, woven, combination food condiment slice using a cutting operation. The cutting operation is performed by a cutting tool such as those described previously and shown in FIGS. 16, 17, 18, and 19. The shaping, forming, or embossing surfaces are optionally provided. The cutting tool is provided with vacuum ports VAC at the inner upper surface, as shown in FIG. 29. As the cutting tool cuts through the woven food condiment sheet to form the sandwich-sized, single-serve, combination woven food condiment slice FCS, a vacuum is applied through the vacuum ports VAC in the cutting tool to attach or hold the formed woven food condiment slice FCS against the inner upper surface of the cutting tool. The cutting tool is then removed from the woven food condiment sheet, carrying the woven food condiment slice FCS against its inner upper surface. The cutting tool along with the woven food condiment slice FCS is then mated with a lower mold LM wherein the cutting tool now functions as an upper mold UM. The peripheral cutting blades PCB located on the cutting tool or upper mold UM are fitted into a cavity or trough (not shown) within the lower mold LM. The outer wall or surface of the cutting blade mates with outer wall of the trough and the inner wall or surface of the peripheral cutting blade PCB mates with the inner wall surface of the trough. The inner molding cavity of the lower mold LM is defined by a barrier wall that is adjacent and positioned at the perimeter of the inner wall surface of the trough. The cut woven food condiment slice FCS is positioned within the lower mold cavity LMC which has the final shape of a sandwich-sized, single-serve, woven combination food condiment slice FCS. The woven food condiment slice FCS is positioned such that the cut ends of the woven food condiment slice FCS are abutting the inside surface of the barrier wall. Prior to positioning the food condiment slice within the lower mold LM, an edible bonding material EBM is positioned within the lower mold cavity LMC such that it extends inward a peripheral distance from the inside surface of the barrier wall into the central portion of the lower molding cavity LMC. The woven food condiment slice FCS is positioned on the edible bonding material EBM such that the bottom periphery adjacent the edges of the woven food condiment slice FCS coincides with the upper surface of the edible bonding material EBM. In order to fuse the edible bonding material EBM with the woven food condiment slice FCS, the lower mold cavity LMC has a heating/cooling plate HCP which runs along the lower mold floor LMF of the lower mold cavity LMC. The heating/cooling plate HCP is positioned below and parallel to or in concert with the periphery of woven food condiment slice FCS. It is important that the woven food condiment slice FCS be positioned in the lower mold cavity LMC with the correct orientation such that the periphery and edible bonding material EBM are positioned over and run parallel with or in concert with the heating/cooling plate HCP. Note from FIG. 29 that the peripheral surfaces of the woven food condiment slice FCS and the edible bonding material EBM overlie the heating/cooling plate HCP, as indicated by the arrows, when positioned in the lower mold cavity LMC. The periphery of the woven food condiment slice FCS and the edible bonding material EBM are in a face-to-face relationship. Cooling or insulating plates CIP are adjacent to the heating/cooling plate HCP and form the remaining portions of the lower mold floor LMF of the lower mold cavity LMC. The cooling or insulation plates CIP protect the remaining portion of the woven food condiment slice FCS not in contact with the heating/cooling plate HCP and not intended to be heated or shaped. The woven food condiment slice FCS and edible bonding material EBM can be maintained in position within the lower mold cavity LMC by use of vacuum, if so desired. The upper mold UM mates with the lower mold section LM holding the edible bonding material EBM and positions the woven food condiment slice FCS over the edible bonding material EBM by releasing the vacuum VAC. The upper mold section UM has a heating/cooling plate HCP running along the upper mold floor UMF above and parallel to or in concert with the periphery of the woven food condiment slice FCS. The upper mold section UM also has cooling or insulating plates CIP adjacent to the heating/cooling plate HCP to protect the remaining portions of the woven food condiment slice FCS not in contact with the heating/cooling plate HCP from being heated. After the woven food condiment slice FCS has been positioned in the lower mold cavity LMC, the heating/cooling plates HCP, in the upper mold section UM and the lower mold section LM, respectively, are heated to cause the periphery of the woven food condiment slice FCS and the edible bonding material EBM to flow in and around the interstices of the peripheral strips and/or strands of the of the woven food condiment slice FCS to unite and bond the strips and/or strands together. The fusion of the woven food condiment slice FCS with the edible bonding material EBM ensures that the woven combination woven food condiment slice FCS will maintain its woven structure. Also, the lower mold cavity LMC and/or the upper mold UM can be provided with a shaping surface to allow a decorative design, indicia, crimping, or border to be embossed or shaped into the periphery or other desired area of the woven food condiment slice FCS.

It is also noted that the method can be used to face-fuse two woven food condiment slices together at their peripheral portions. This method is used in the instant invention to sandwich or envelope a food condiment slice within or in between the two woven food condiment slices such that the sandwiched or enveloped food condiment slice is disposed or housed within the confines of the outer woven walls of the food condiment slices. The sandwiched or enveloped food condiment slice may be fusion bonded at its peripheral edge portion with the inner face peripheral edge portions of the two woven food condiment slices. However, the centrally located inner face surfaces of the woven food condiment slices are not bonded to the centrally located outer face surfaces of the sandwiched or enveloped food condiment slice.

Woven Food Condiment Slice Using Face-Fused Strips and/or Strands

An alternative to the third embodiment of the instant invention is to form a sandwich-sized, single-serve, woven food condiment slice using face-fused strips and or strands. The method comprises weaving face-fused strands and/or strips cut from a face-fused combination food condiment sheet to form a woven combination food condiment sheet. The woven combination food condiment sheet can be manufactured by weaving face-fused combination strips and/or strands comprised of the desired food condiments. The face-fused combination strips and/or strands are formed by a cutting operation performed on previously formed face-fused combination food condiment sheets. The first step for producing sandwich-sized, single-serve, combination, woven food condiment slices using face-fused strips and/or strands is to produce food condiment sheets of a single food condiment. The method of producing food condiment sheets of a single food condiment was discussed previously in the first embodiment of the instant invention and is hereby incorporated in this discussion. As discussed, single food condiment sheets can be formed through extrusion molding, thin film molding, injection molding, compression molding, or any other process or combination of processes which will accomplish the objective of forming food condiment sheets of a single food condiment. The next step is to produce face-fused, combination food condiment sheets. Methods of producing face-fused, combination, food condiment sheets was discussed in the second embodiment of the instant invention and is hereby incorporated into this discussion. Following formation of the face-fused, combination food condiment sheets, face-fused strips and/or strands are cut from the face-fused combination food condiment sheet using a cutting operation. The face-fused strips and/or strands are comprised of a first food condiment bonded by face-fusion to a second food condiment. The face-fused strips and/or strands have a first food condiment on a first face surface and a second food condiment on a second face surface. The face-fused strips and/or strands cut from the face-fused, combination food condiment sheet are then interwoven to form a woven combination food condiment sheet formed from face-fused strips and/or strands. The face-fused strips and/or strands may be woven at any desired angle to each other. Also, since the face-fused strands and/or strips have one food condiment on one face and a second food condiment on the opposite face, the weaving operation may be accomplished such that the first food condiment is on one face of the woven combination food condiment sheet and the second food condiment is on the opposite face of the woven combination food condiment sheet. Alternatively, the weaving operation can be performed such that adjacent face-fused strips and/or strands used to form each face of the woven combination food condiment sheet can be reversed such that one face-fused strand or strip displays a first food condiment and its adjacent face-fused strand or strip displays a second food condiment. The result being that each face of the woven combination food condiment sheet has first and second food condiments displayed. After forming the woven combination food condiment sheet, a cutting operation, as described above, is performed to produce woven combination food condiment slices formed from face-fused strips and and/or strands.

Face-Fused and Single Food Condiment Strips and/or Strands

As an alternative, the woven combination food condiment sheet may have face-fused strips and/or strands cut from a face-fused combination food condiment sheet and strips and/or strands cut from a food condiment sheet of a single food condiment. This method of weaving face-fused strips and/or strands cut from a face-fused combination food condiment sheet and strips and/or strands cut from a food condiment sheet formed from a single food condiment permits use of a plurality of food condiments in the final woven combination food condiment sheet.

Three condiments can also be provided in a woven combination food condiment sheet by weaving face-fused strips and/or strands from a face-fused combination food condiment sheet having three different condiments face-fused together.

Also, weaving of face-fused strips and/or strands from a first face-fused combination food condiment sheet, formed from at least one food condiment with face-fused strips and/or strands from a second face-fused combination food condiment sheet formed from at least one food condiment allows construction of a woven combination food condiment sheet having a plurality of food condiments. Any number of condiments can be woven together to form a woven combination food condiment sheet. Such as, weaving face-fused strips and/or strands having three face-fused condiments, with face-fused strips and/or strands having two or more face-fused condiments. The resulting face-fused combination food condiment sheet is divided, by cutting, into face-fused strips and/or strands which are subsequently interwoven to form a woven combination food condiment sheet. After forming the woven combination food condiment sheet, a cutting and edge sealing operation, as described above, is performed to produce woven combination food condiment slices.

Side-Fused and Single Food Condiment Strips and/or Strands

A woven combination food condiment sheet may have side-fused strips and/or strands cut from a side-fused combination food condiment sheet. Additionally, a woven combination food condiment sheet may have side-fused strips and/or strands cut from a side-fused combination food condiment sheet and strips and/or strands cut from a food condiment sheet of a single food condiment. This method of weaving side-fused strips and/or strands cut from a side-fused combination food condiment sheet with strips and/or strands cut from a food condiment sheet formed from a single food condiment permits use of a plurality of food condiments in the final woven combination food condiment sheet. After forming the woven food condiment sheet, a cutting and edge sealing operation is performed to produce woven combination food condiment slices.

Side-Fused-Face-Fused Food Condiment Strips and/or Strands

The fusion process can also include a side-fused combination food condiment sheet which is face-fused to a food condiment sheet of a single food condiment. The resulting strips and/or strands are both side-fused and face-fused. The cutting operation performed on the side-fused-face-fused combination food condiment sheet to form strips and/or strands for forming woven combination food condiment sheets is performed such that the strips and/or strands include substantially each of the condiments present in the side-fused-face-fused food condiment sheet.

Additionally, two or more side-fused, combination, food condiment sheets can be face-fused together. This permits a plurality of condiments to be represented in the resulting side-fused-face-fused combination food condiment sheet. The resulting side-fused-face-fused combination food condiment sheet is divided, by cutting, into side-fused-face-fused strips and/or strands which are subsequently interwoven to form a woven combination food condiment sheet. After forming the woven combination food condiment sheet, a cutting and edge sealing operation, as described above, is performed to produce woven combination food condiment slices.

The side-fused-face-fused combination food condiment sheets may also be divided by cutting the sheet into food condiment strip sheets.

Face-Fusion of Woven Food Condiment Sheets

An additional woven, food condiment forming, embodiment comprises, first, weaving a woven combination food condiment sheet from strips and/or strands that have been cut from a food condiment sheet of a single food condiment. A second woven combination food condiment sheet is formed from strips and/or strands cut from a second food condiment sheet of a single food condiment. The two separate woven combination food condiment sheets can then be combined at their face surfaces by sandwiching an edible bonding layer between the two woven food condiment sheets. The method comprises heating the edible bonding layer on both sides and applying the heated edible bonding layer to the upper surface of the first woven combination food condiment sheet such that the preheated edible bonding layer bonds to the strips and/or strands of the first woven combination food condiment sheet. The second woven combination food condiment sheet is then applied to the opposite preheated face surface of the heated edible bonding sheet such that the preheated edible bonding sheet bonds to the strips and/or strands of the second woven combination food condiment sheet. The resulting woven face-fused combination food condiment sheet formed has a first outer face formed from a woven food condiment sheet comprised of a first woven food condiment and a second outer face, opposite the first outer face, formed from a woven food condiment sheet comprised of a second woven food condiment. The two inner faces are joined or fused in a face-to-face relationship by the edible bonding sheet. The edible bonding sheet also acts to retain the woven combination food condiment strips and/or strands in the first and second woven combination food condiment sheets in a woven form before and after cutting of the woven face-fused combination food condiment sheet to produce woven face-fused combination food condiment slices. It is noted that the edible bonding sheet can be any desired edible material that will function in the manner described, a single food condiment sheet, a face-fused food condiment sheet, a side-fused food condiment sheet, or any combination described heretofore. Also, each of the woven food condiment sheets being joined or face-fused together may be formed of strips and/or strands of one or more food condiments, such as face-fused, side-fused, or face-fused-side-fused strips and/or strands or any combination thereof. Additionally, the strips and/or strands being used for weaving the food condiment sheets can be formed by the processes described previously.

An alternative to using an edible bonding sheet is to spray or paint the woven strips and/or strands of the woven food condiment sheet with a liquid edible bonding material prior to the face-fusion step of the two woven combination food condiment sheets. The edible bonding material will function to retain the weaving pattern given to the woven food condiment sheets and function to bond the two woven combination food condiment sheets together in a face-fused fashion. The cutting operation, as previously disclosed, is then executed to form sandwich-sized, single-serve, woven combination food condiment slices.

A further method is to pre-coat the food condiment strips and/or strands with a liquid edible bonding material using a dipping or spraying or painting operation prior to the weaving step. The liquid edible bonding material is dried on the strips and/or strands. Fusion of the woven combination food condiment slices is accomplished by placing the woven combination food condiment sheets in a face-to-face relationship and cutting through the woven combination food condiment sheets to form a woven combination food condiment slice. Bonding of the woven combination food condiment sheets is achieved by application of heat which allows the edible bonding material pre-coated on the strips and/or strands to flow and fuse with the edible bonding material pre-coated on adjacent strips and/or strands of the woven face-fused combination food condiment. If desired, a compression tool, as described previously, either separate or in combination with the cutting tool, can be used to apply pressure to the outer peripheral edges of the sandwich-sized, single-serve, face-fused, woven, combination food condiment slice to cause bonding of the two sandwich-sized, single-serve, woven, combination food condiment slices at the outer peripheral edges through application of pressure and heat to cause fusion of the strips and/or strands. Also, the food condiment sheets from which strips and or strands are cut can be coated or face-fused with an edible bonding layer. After the strips and/or strands are cut from the food condiment sheet having a coated surface of edible bonding material, or having been face-fused with the edible bonding layer, the coated strips and/or strands are interwoven into a woven combination food condiment sheet. The woven combination food condiment sheets are then face-fused by positioning the woven combination food condiment sheets in a face-to-face relationship and heating the woven combination food condiment sheets while in the face-to-face relationship to cause the coated edible bonding material of the first woven food condiment sheets to soften, flow, and fuse with the coated edible bonding material of the second woven food condiment sheet. The resulting face-fused sheet can then be cut to form face-fused, woven combination food condiment slices.

As an alternative method for face-fusing woven combination food condiment sheets together comprises positioning an edible edge sealer having the shape of the outer periphery of the woven combination food condiment sheet over the upper peripheral surface of a first woven combination food condiment sheet. Then, positioning a second woven combination food condiment sheet over the upper surface of the first woven combination food condiment sheet and the upper surface of the edible edge sealer such that the bottom outer peripheral surface of the second woven combination food condiment sheet is in contact with the upper surface of the edible edge sealer. It is noted that edible edge sealing material can also be positioned on the bottom peripheral surface of the first woven combination food condiment sheet and/or on the upper surface of the second woven combination food condiment sheet. A compression/heating tool is then applied to the outer peripheral upper surface of the second woven combination food condiment sheet to compress and heat the edible edge sealer and the peripheral outer surfaces of the woven combination food condiment sheet to heat the edible edge sealer to its flow temperature such that the edible edge sealer softens and flows into and around the interstices of the overlapping woven strips and/or strands in the peripheral areas of the first and second combination food condiment sheets. After a predetermined time, the compression/heating tool is removed to provide a face-fused, woven, combination food condiment sheet. This method functions to maintain the woven food condiment sheets in a face-to-face relationship for subsequent operations. This process can also be used for sealing the peripheral outer surfaces and edges of a single woven combination food condiment slice and for face-fusing of a plurality of woven combination food condiment slices.

As a further alternative for face-fusing woven combination food condiment slices, an edible edge sealant material shaped for enveloping the outer edge and periphery of the woven food condiment sheets, such as that shown in FIG. 25, is made to overlie the periphery and edge portion of the woven food condiment sheet. Next, heat is applied to the edible edge sealant material using a compression/heating tool to compress and heat the preformed edible edge sealer material to its flow temperature such that the preformed edible edge sealer softens and flows into and around the interstices of the woven peripheral cut edges of the woven food condiment sheet to bond the molten edible edge sealer to the peripheral cut edges of the woven food condiment sheet to thereby retain the weaving pattern given to the woven food condiment sheet. This process can also be used on woven combination food condiment slices for retaining the weaving pattern for subsequent operations. Additionally, the same process can be used for face-fusing of woven combination food condiment slices.

As an example of using a product formed by the third embodiment, an individual preparing a sandwich, for example, desiring to use catsup and mustard on the sandwich can do so by removing a woven combination food condiment slice of catsup and mustard from the hermetically sealed protective wrapping by opening the plastic wrapping and removing the woven combination food condiment slice of catsup and mustard from the cellophane or plastic wrapping. The woven combination food condiment slice of catsup and mustard is then placed whole in or on a sandwich without the requirement and inconvenience of spreading, pouring, or squeezing the two condiments onto the bread or sandwich. The advantages of combining the condiments into a woven combination food condiment slice are that only one package need be purchased rather than two or more bottles and jars; reduced weight and number of packages when on outings, vacations, picnics, and barbeques, for example; much easier to store—less storage space needed; and reduces time needed for preparing sandwiches or cooking a food item that uses a condiment of the instant invention.

Forming Woven Sheets by Extrusion

The woven strips and/or strands may also be formed by extrusion of the strips and/or strands from an extrusion apparatus onto a work surface. The strips and/or strands may be formed from one or more food condiments. A plurality of extrusion nozzles can be used to extrude the food condiment strips and/or strands to form the woven food condiment sheet with the desired angle between the strips and/or strands.

Chopped Food Condiment Sheets and Slices

The face-fusion method is also used for face-fusing edible bonding sheets to a face of a food condiment sheet. The technique of face-fusing edible bonding sheets is useful in subsequent operations which use strips and/or strands or cut pieces of food condiment sheets of a single food condiment, face-fused food condiments, side-fused food condiments, or any combination thereof, for use in forming woven food condiment sheets or slices, or chopped food condiment sheets or slices. By face-fusing an edible bonding sheet to a sheet of a single food condiment, face-fused food condiment, side-fused food condiment, or any combination thereof, the strips and/or strands cut from these sheets for use in weaving woven food condiment sheets or slices, or for use in forming chopped food condiment sheets or slices would substitute for the other methods applying edible bonding materials disclosed in embodiments described hereafter.

Figure 28:
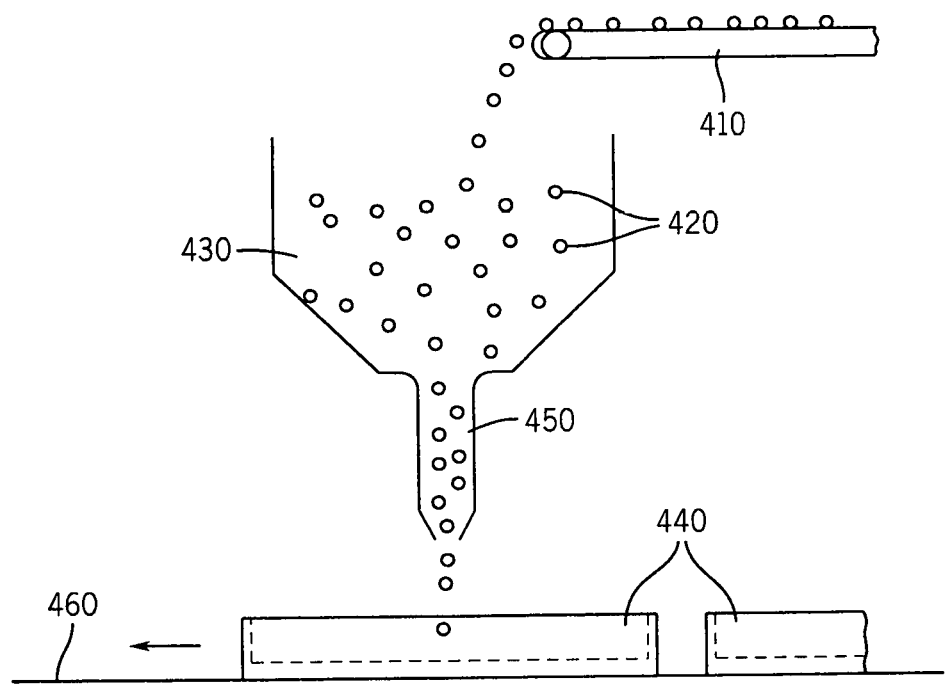
FIG. 28 is a cross-sectional view of a hopper/ejection apparatus used for distributing food condiment pieces to a mold to form chopped food condiment sheets or slices.

A forth embodiment of the instant invention is to provide a sandwich-sized, single-serve, chopped food condiment slice comprising at least one food condiment. The at least one food condiment in the sandwich-sized, single-serve, chopped food condiment slice exists as a plurality of discontinuous or chopped pieces which are intermixed and fused together at their surfaces. The chopped pieces of condiment making up the chopped food condiment slice are intermixed or intermingled with each other. If there is more than one condiment, the number of discontinuous, broken, or chopped pieces of each food condiment can be approximately equal and proportionately mixed or may vary depending on the amount of each food condiment desired in the sandwich-sized, single-serve, chopped food condiment slice. The sandwich-sized, single-serve, chopped food condiment slice can be formed by first producing a sheet formed chopped food condiment sheet. The sheet formed chopped food condiment sheet may be a chopped food condiment sheet of a single food condiment, or a fused combination chopped food condiment sheet. The method initially comprises producing food condiment sheets of a single food condiment from which food condiment pieces are produced. The first embodiment of the instant invention discusses methods for producing food condiment sheets of a single food condiment and is hereby incorporated in this discussion. Also, the method of producing face-fused, side-fused, and face-fused-side-fused combination food condiment sheets was discussed in the second embodiment of the instant invention and is hereby incorporated in this discussion. As discussed, food condiment sheets can be formed through extrusion molding, thin-film molding, injection molding, compression molding, or any other process, or combination of processes, that will accomplish the objectives of forming sheet-formed food condiments. After forming a food condiment sheet of a single food condiment, or a face-fused combination food condiment sheet, or a side-fused combination food condiment, the food condiment sheet is divided, by cutting, to form chopped food condiment pieces of any desired shape. Examples of such shapes include, but are not limited to, rod-shapes, sphere-shapes, disc-shapes, spaghetti-strand-shapes, geometrical-shapes, shredded-shapes, etc. The food condiment pieces 420 can then be transferred, as by a conveyer 410, to a hopper/ejection apparatus 430, as shown in FIG. 28. The food condiment pieces 420 are processed through a hopper/ejection apparatus 430. The hopper/ejection apparatus 430 ejects the chopped food condiment pieces 420, by air or inert gas blowing, at a sheet mold 440 located beneath ejection nozzle 450 of the hopper/ejection apparatus 430 to form a chopped food condiment sheet, or at a slice-sized mold to form a sandwich-sized, single-serve, chopped food condiment slice. The ejection nozzle 450 can span the width or length of the mold 440 such that the length or width of the mold 440 receives food condiment pieces 420 as the mold 440 is conveyed beneath the ejection nozzle 450 on conveyer 460. Also, the ejection nozzle 450 can be laterally movable above mold 440 which moves with conveyer 460 in incremental steps following a full length or width distribution of the food condiment pieces 420 into mold 440. The temperature of the air or insert gas used to blow the chopped food condiment pieces 420 should be such that it functions to heat, cool, or maintain the temperature of the outer surfaces of the chopped food condiment pieces 420 so that the chopped food condiment pieces 420 will adhere to each other at their contacting surfaces after their distribution in the mold 440. If a chopped food condiment sheet is formed through the blowing operation, the sheet is thereafter processed through a cutting step in which the chopped food condiment sheet is divided into separate sandwich-sized, single-serve, chopped food condiment slices. This cutting method can be performed with a cutting tool of the type previously described in conjunction with FIGS. 15-19 and 24. The chopped food condiment sheet can be made by blowing one or more different types of food condiments into a mold to form a chopped combination food condiment sheet. The ejection apparatus used to eject the cut pieces of food condiment at the molding surfaces can also be used to coat the cut condiment pieces with an edible bonding material, such as by spraying an edible bonding material in liquid form, so as to enhance adhesion of the cut food condiment pieces.

Also, fused condiment pieces that originate from fused combination food condiment sheets can be used to form chopped food condiment sheets or slices, in which they alone are used, or the fused chopped food condiment pieces can be used in conjunction with chopped food condiment pieces of a single food condiment. That is, different combinations of food condiment pieces can be used to form a chopped food condiment sheet or slice. The cutting tool used to perform the cutting operation of the chopped food condiment sheets may have a surface used for compression and also both the compression surface and cutting blades may be heated to a temperature that will allow at least one of the food condiments to flow. The compression surface of the cutting/compression tool permits a decorative design or border to be embossed into the periphery or other desired area of the chopped food condiment slice during the cutting/compression step. The compression surface of the cutting/compression tool mates with and compresses a peripheral portion of the formed chopped food condiment slice during the cutting compression step in the fashion shown and described by FIGS. 15-19 and 24. The cutting/compression tool may also provide or form a raised border, or crimped border to the chopped food condiment slice. The heating of the cutting/compression tool to the flow point temperature of at least one of the chopped food condiments provides smooth cut edges to the sandwich-sized, single-serve, chopped food condiment slices. If a sandwich-sized, single-serve, food condiment slice is formed by the blowing operation, then the sandwich-sized, single-serve, food condiment slice is removed from the mold before, after, or during cooling. It is also noted that the chopped food condiment slices can be compressed on their face surfaces to blend the condiments and smooth the face surfaces.

The food condiment pieces may also be formed by extrusion, in which the food condiment is extruded. The extruded food condiment can be cut or divided as it is extruded, or it can be extruded and then divided in a separate cutting operation. The extruded food condiment pieces can then be conveyed to a hopper/ejection apparatus which will eject the cut food condiment pieces, using air or inert gas blowing, at a mold to form a sheet, or at a mold to form a sandwich-sized, single-serve, chopped food condiment sheets or slice. The extrusion apparatus may also provide one or more extrusion outlets that allow fusion of a plurality of different types of food condiments. The bonded extruded food condiment is then divided by cutting into chopped food condiment pieces. Depending on the temperature of the extruded, cut, food condiment pieces, the temperature of the air or inert gas used to blow the chopped food condiment pieces should be such that it heats, cools, or maintains the temperature of the outer surfaces of the chopped food condiment pieces so that the chopped food condiment pieces will adhere to each other at their contacting surfaces in the mold. The ejection apparatus used to eject the cut pieces of food condiment at the molding surfaces, can also be used to coat the cut condiment pieces with an edible bonding material, such as by spraying an edible bonding material in liquid form, so as to enhance adhesion of the cut food condiment pieces to each other.

As an example, an individual preparing a sandwich desiring to use catsup and mustard on the sandwich can do so by removing sandwich-sized, single-serve, chopped combination food condiment slice having fused pieces of catsup and mustard, which are intermixed and fused at their surfaces, from a hermetically sealed protective wrapping by opening the wrapping and removing the sandwich-sized, single-serve, chopped combination food condiment slice of catsup and mustard and then placing the slice on the sandwich without the requirement and inconvenience of spreading, pouring, or squeezing the two condiments onto the bread or sandwich. The advantages of combining the two condiments into a chopped food condiment slice are that only one package need be purchased rather than two or more; reduced weight and number of packages when on outings vacations, picnics, and barbeques, for example; much easier to store— less storage space needed; and reduces time needed for preparing sandwiches or cooking a food item.

Food Condiment Compositions for Use in Forming Food Condiment Slices

The food condiment slices and sheets used in the instant invention can be manufactured using the following compositions:

Catsup Slices:

An existing pourable, spreadable, squeezable, etc., catsup or ketchup condiment can be used or, alternatively, one or more of the following ingredients can be combined and mixed with other ingredients to form a catsup or ketchup composition having the desired concentration and consistency for making catsup or ketchup food condiment slices, the ingredients comprising:

➢ Tomatoes (puréed, paste) or tomato concentrate (water, tomato paste), spices, garlic, vinegar, salt, flavoring, onion powder, corn syrup.

A catsup food condiment slice was prepared comprising the following method. First, ¼ teaspoonful of finely divided gelatin powder was added to one tablespoonful of the catsup composition. The catsup composition and gelatin were then mixed thoroughly to form a catsup/gelatin mixture. The catsup/gelatin mixture was then distributed into non-stick plate molds. The plate molds with the catsup/gelatin mixture was then refrigerated until the mixture solidified. Good results were obtained.

A second catsup food condiment slice was prepared using one tablespoonful of the catsup composition. However, the quantity of gelatin used was ½ teaspoonful. The catsup composition and gelatin were then mixed thoroughly to form a catsup/gelatin mixture. The catsup/gelatin mixture was distributed into non-stick plate molds. The plate molds with the catsup/gelatin mixture were then refrigerated until the mixture solidified. Good results were obtained.

A third catsup food condiment slice was prepared using one tablespoonful of the catsup composition. First, ¼ teaspoonful of powdered egg whites was added to the catsup composition. The egg whites were stirred with the catsup until well blended with the catsup composition to form an egg whites/catsup mixture. Next, a second ¼ teaspoonful of powdered egg whites was added to the egg whites/catsup mixture and stirred until well blended. Next, ½ teaspoonful of gelatin was added to the egg whites/catsup mixture and stirred until well blended to form an egg whites/catsup/gelatin mixture. The egg whites/catsup/gelatin mixture is then heated, by microwave, for 10-15 seconds on low heat. The egg whites/catsup/gelatin mixture was then stirred again thoroughly until well blended. The egg whites/catsup/gelatin mixture was then distributed into non-stick plate molds. The plate molds with the egg whites/catsup/gelatin mixture were then refrigerated until the mixture solidified. Excellent results were obtained.

It is noted that the quantity of gelatin used will depend on the initial water content of the catsup composition and the final firmness or flexibility and other characteristics desired for the catsup food condiment slice. Other solidifying agents such as pectin, gum extract, and aspic powder, etc., may be used with or in place of gelatin. Also, other agents such as flour or cornstarch can be used with the egg whites or in place of the egg whites as a smoothing agent. Also, food coloring may be added to obtain the desired color depth. The catsup or ketchup condiment used to form the catsup or ketchup food condiment slices of the instant invention can also be flavored and/or colored, such as: smoke flavor, spicy, and other flavors as desired.

Mustard Slices:

An existing pourable, squeezable, spreadable, etc., mustard condiment can be used or, alternatively, one or more of the following ingredients can be combined and mixed with other ingredients to form a mustard condiment composition having the desired concentration and consistency for making mustard food condiment slices, the ingredients comprising:

➢ Mustard seed, vinegar, water, salt, turmeric, paprika sugar, honey, spices, flavoring.

A mustard food condiment slice was prepared comprising the following method. First, ¼ teaspoonful of powdered egg whites was added to one tablespoonful of the mustard composition. The egg whites were stirred with the mustard until well blended with the mustard composition to form an egg whites/mustard mixture. Next, a second ¼ teaspoonful of powdered egg whites was added to the egg whites/mustard mixture and stirred until well blended. Next, ½ teaspoonful of gelatin was added to the egg whites/mustard mixture and stirred until well blended to form an egg whites/mustard/gelatin mixture. The egg whites/mustard/gelatin mixture was then heated, by microwave, for 10-15 seconds on low heat. The egg whites/mustard/gelatin mixture was then stirred thoroughly until well blended. The egg whites/mustard/gelatin mixture was then distributed into non-stick plate molds. The plate molds with the egg whites/mustard/gelatin mixture were then refrigerated until the mixture solidified. Excellent results were obtained.

It is noted that the quantity of gelatin used will depend on the initial water content of the mustard composition and the final firmness or flexibility and other characteristics desired for the mustard food condiment slice. Other solidifying agents such as pectin, gum extract, and aspic powder, etc., may be used with or in the place of gelatin. Also, other agents such as flour or cornstarch can be used with the egg whites or in place of the egg whites as a smoothing agent. The mustard condiment used to form the mustard food condiment slices of the instant invention can also be flavored and/or colored, such as: honey, spicy, hot, brown, yellow, Dijon, and other flavors as desired.

Mayonnaise Slices:

An existing pourable, squeezable, spreadable, etc., mayonnaise condiment can be used or, alternatively, one or more of the following ingredients can be combined and mixed with other ingredients to form a mayonnaise condiment composition having the desired concentration and consistency for making mayonnaise food condiment slices, the ingredients comprising:

➢ Water, soybean oil, sugar, vinegar, food starch, salt, eggs, preservatives, coloring, spice, xanthan gum, flavoring, paprika, lemon, flavoring.

A mayonnaise food condiment slice was prepared comprising the following method. First, ¼ teaspoonful of powdered egg whites was added to one tablespoonful of the mayonnaise composition. The egg whites were stirred with the mayonnaise until well blended with the mayonnaise composition to form an egg whites/mayonnaise mixture. Next, a second ¼ teaspoonful of powdered egg whites was added to the egg whites/mayonnaise mixture and stirred until well blended. Next, ½ teaspoonful of gelatin was added to the egg whites/mayonnaise mixture and stirred until well blended to form an egg whites/mayonnaise/gelatin mixture. The egg whites/mayonnaise/gelatin mixture was then heated, by microwave, for 10-15 seconds on low heat. The egg whites/mayonnaise/gelatin mixture was then stirred again thoroughly until well blended. The egg whites/mayonnaise/gelatin mixture was then distributed into non-stick plate molds. The plate molds with the egg whites/mayonnaise/gelatin mixture were then refrigerated until the mixture solidified. Excellent results were obtained.

It is noted that the quantity of gelatin used will depend on the initial water content of the mayonnaise composition and the final firmness or flexibility and other characteristics desired for the mayonnaise food condiment slice. Other solidifying agents such as pectin, gum extract, and aspic powder, etc., may be used with or in the place of gelatin. Also, other agents such as flour or cornstarch can be used with the egg whites or in place of the egg whites as a smoothing agent. The mayonnaise condiment used to form the mayonnaise food condiment slices of the instant invention can also be flavored and/or colored.

Steak or Meat Sauce Slices:

An existing pourable, squeezable, spreadable, etc., steak or meat sauce product can be used or, alternatively, one or more of the following ingredients can be combined and mixed with other ingredients to form a steak or meat sauce composition having the desired concentration and consistency for making steak or meat sauce food condiment slices, the ingredients comprising:
➤ Vinegar, water, molasses, corn syrup, salt, coloring, garlic, sugar, spices, flavoring.

A steak or meat sauce food condiment slice was prepared comprising the following method. First, ¼ teaspoonful of powdered egg whites was added to one tablespoonful of the steak or meat sauce composition. The egg whites were stirred with the steak or meat sauce until well blended with the steak or meat sauce composition to form an egg whites/steak or meat sauce mixture. Next, a second ¼ teaspoonful of powdered egg whites was added to the egg whites/steak or meat sauce mixture and stirred until well blended. Next, ½ teaspoonful of gelatin was added to the egg whites/steak or meat sauce mixture and stirred until well blended to form an egg whites/steak or meat sauce/gelatin mixture. The egg whites/steak or meat sauce/gelatin mixture was then heated, by microwave, for 10-15 seconds on low heat. The egg whites/steak or meat sauce/gelatin mixture was then stirred again thoroughly until well blended. The egg whites/steak or meat sauce/gelatin mixture was then distributed into non-stick plate molds. The plate molds with the egg whites/steak or meat sauce/gelatin mixture were then refrigerated until the mixture solidified. Excellent results were obtained.

It is noted that the quantity of gelatin used will depend on the initial water content of the steak or meat sauce composition and the final firmness or flexibility and other characteristics desired for the steak sauce food condiment slice. Other solidifying agents such as pectin, gum extract, and aspic powder, etc., may be used with or in the place of gelatin. Also, other agents such as flour or cornstarch can be used with the egg whites or in place of the egg whites as a smoothing agent. The steak or meat sauce condiment used to form the steal or meat sauce food condiment slice of the instant invention can be flavored and/or colored, such as: honey, smoke flavored, spicy, hot, and other flavors as desired.

Barbecue Sauce Slices:

An existing pourable, spreadable, squeezable, etc., barbecue sauce product can be used or, alternatively, one or more of the following ingredients can be combined and mixed with other ingredients to form a barbecue sauce composition having the desired concentration and consistency for making barbecue sauce food condiment slices, the ingredients comprising:
➤ Tomatoes (puréed, paste) or tomato concentrate (water, tomato paste), sugar, vinegar, honey, salt, food starch, molasses, mustard flavor, onion powder, garlic powder, spices, colorings, flavorings high fructose corn syrup, water, paprika, brown sugar, mustard flavor, mustard seed.

A barbecue sauce food condiment slice was prepared comprising the following method. First, ¼ teaspoonful of powdered egg whites was added to the barbecue sauce composition. The egg whites were stirred with the barbecue sauce until well blended with the barbecue sauce composition to form an egg whites/barbecue sauce mixture. Next, a second ¼ teaspoonful of powdered egg whites was added to the egg whites/barbecue sauce mixture and stirred until well blended. Next, ½ teaspoonful of gelatin was added to the egg whites/barbecue sauce mixture and stirred until well blended to form an egg whites/barbecue sauce/gelatin mixture. The egg whites/barbecue sauce/gelatin mixture was then heated, as by microwave, for 10-15 seconds on low heat. The egg whites/barbecue sauce/gelatin mixture was then stirred again thoroughly until well blended. The egg whites/barbecue sauce/gelatin mixture was then distributed into non-stick plate molds. The plate molds with the egg whites/barbecue sauce/gelatin mixture were then refrigerated until the mixture solidified. Excellent results were obtained.

It is noted that the quantity of gelatin used will depend on the initial water content of the barbecue sauce composition and the final firmness or flexibility and other characteristics desired for the barbecue sauce food condiment slice. Other solidifying agents such as pectin, gum extract, and aspic powder, etc., may be used with or in the place of gelatin. Also, other agents such as flour or cornstarch can be used with the egg whites or in place of the egg whites as a smoothing agent. The barbecue sauce condiment used to form the barbecue sauce food condiment slices of the instant invention can also be flavored and/or colored, such as: honey, honey mustard, honey smoke, honey smoke molasses, brown sugar, hickory, honey hickory, Dijon mustard, mesquite, and other flavors as desired.

Coffee or Tea Creamer Slices or Discs:

An existing pourable coffee or tea cream beverage condiment can be used or, alternatively, one or more of the following ingredients can be combined and mixed with other ingredients to form a dairy or non-dairy cream composition having the desired concentration and consistency for making coffee or tea beverage condiment slices or discs, the ingredients comprising:
➤ Water, sugar, flavorings, color, sodium stearoyl lactylate, hydrogenated soybean, cottonseed oil, caseinate, dipotassium phosphate, polysorbate, carrageenan, and beta carotene.

A coffee or tea cream beverage condiment slice or disc was prepared comprising the following method. First, ¼ teaspoonful of powdered egg whites was added to the cream composition. The egg whites were stirred with the cream until well blended with the cream composition to form an egg whites/cream mixture. Next, a second ¼ teaspoonful of powdered egg whites was added to the egg whites/cream mixture and stirred until well blended. Next, ½ teaspoonful of gelatin was added to the egg whites/cream mixture and stirred until well blended to form an egg whites/cream/gelatin mixture. The egg whites/cream/gelatin mixture was then heated, as by microwave, for 10-15 seconds on low heat. The egg whites/cream/gelatin mixture was then stirred again thoroughly until well blended. The egg whites/cream/gelatin mixture was then distributed into non-stick plate molds. The plate molds with the egg whites/cream/gelatin mixture were then refrigerated until the mixture solidified. Excellent results were obtained.

It is noted that the quantity of gelatin used will depend on the initial water content of the cream composition and the final firmness or flexibility and other characteristics desired for the coffee or tea beverage condiment slice. Other solidifying agents such as pectin, gum extract, and aspic powder, etc., may be used with or in the place of gelatin. Also, other agents such as flour or cornstarch can be used with the egg whites or in place of the egg whites as a smoothing agent. The coffee or tea creamer beverage condiment used to form the coffee or tea creamer beverage slices of the instant invention can also be flavored and/or colored, such as: hazelnut, cinnamon, vanilla, and other flavors as desired.

CONCLUSION

Accordingly, the reader will see that the food and beverage condiment sheets, slices, or discs of the instant invention can be used with many types of food products for consumption. The food and beverage condiment slices of the invention make packing and carrying of food condiments easier by eliminating the need to carry bulky bottles and jars of condiments. Also, the clean-up required when using messy spreadable, pourable, and squeezable, condiments is eliminated. The advantages of combining the condiments into a combination of two or more condiments per slice are that only one package need be purchased rather than two or more; reduced weight and number of condiment packages when on outings vacations, picnics, and barbeques, for example; much easier to store—less storage space needed; and reduction in the time needed to prepare a sandwich or cook a food.

Although the description above contains many specificities, these should not be construed as limiting the scope of the embodiments. For example, the thickness of a food condiment or beverage condiment slice can also vary depending on its size (length, width, or diameter, etc.). Additionally, the strips and/or strands of the woven food or beverage condiment slice can be braided, intertwined, twisted, etc.

I claim:

1. A method for forming a condiment slice comprising:
   a) forming at least one condiment sheet;
   b) dividing said at least one condiment sheet to form condiment strips;
   c) interweaving said condiment strips to form at least one woven condiment structure;
   d) penetrating and cutting said at least one woven condiment structure using a cutting/shaping tool to form a woven condiment slice comprising woven condiment strips having cut marginal ends, said woven condiment slice having a geometrical area and shape, said geometrical area delineated by an outer perimeter comprising said cut marginal ends;
   e) removing said woven condiment slice from said woven condiment structure using said cutting/shaping tool and transporting said woven condiment slice to a lower mold section, mating said cutting/shaping tool and said woven condiment slice with said lower mold section;
   f) positioning said woven condiment slice in said lower mold section; said cutting/shaping tool applying compression to said cut marginal ends of said woven condiment strips to cause said cut marginal ends to reshape against a shaping surface of said cutting/shaping tool and cause said woven condiment strips to adhere together at said perimeter forming a continuous border that maintains said woven condiment slice in its woven form.

2. The method of claim 1, wherein said transporting and positioning steps are performed using a vacuum applied to said woven condiment slice through said cutting/shaping tool.

3. The method of claim 1, wherein a peripheral edge sealing material is positioned in said lower mold section prior to said positioning of said woven condiment slice therein.

4. The method of claim 3, wherein said method comprises applying heat to cause said peripheral edge sealing material to flow around and into the interstices of said cut marginal ends of said woven condiment strips to assist in binding said cut marginal ends together.

5. The method of claim 1, wherein said step of forming at least one condiment sheet comprises forming at least one single-condiment sheet, and/or at least one multiple-condiment sheet, and/or at least one face-fused single-condiment sheet, and/or at least one face-fused multiple-condiment sheet, and/or at least one face-fused bonding layer condiment sheet, and/or at least one side-fused single-condiment sheet, and/or at least one side-fused multiple-condiment sheet, and/or at least one face-fused-side-fused single-condiment sheet, and/or at least one face-fused-side-fused multiple-condiment sheet.

6. The method of claim 1, wherein said step of applying compression to said cut marginal ends comprises embossing or crimping a decorative design into the border of the woven condiment slice.

7. The method of claim 1, wherein said positioning step comprises positioning said cut marginal ends of said woven condiment slice on a heating plate in said lower mold section, wherein said heating plate traverses beneath and parallel with said cut marginal ends of said woven condiment strips of said woven condiment slice, said lower mold section further comprising insulation plates to protect a designated portion of said condiment slice from exposure to heat, and heating said heating plate to assist said cut marginal ends of said woven condiment strips to unite and bond said woven condiment strips together to ensure said woven condiment slice maintains its woven structure.

8. The method of claim 1, wherein said step of positioning said woven condiment slice in said lower mold section further comprises positioning the woven condiment slice in said lower mold section on edible bonding material such that said edible bonding material is in face-to-face contact with only said cut marginal ends of said woven condiment slice and with a heating plate that traverses beneath and parallel with said edible bonding material, and heating said heating plate to cause the edible bonding material to flow in and around the interstices of the cut marginal ends of the woven condiment strips to unite and bond said strips together at the cut marginal ends to ensure the woven food condiment slice maintains its woven structure.

9. The method of claim 1, wherein said step of forming at least one condiment sheet comprises face-fusing two condiment sheets using a bonding layer sheet there-between to form a at least one face-fused bonding layer condiment sheet; said step of dividing comprises dividing said at least one face-fused bonding layer condiment sheet to form face-fused bonding layer condiment strips; interweaving said face-fused bonding layer condiment strips in said interweaving step to form said at least one woven condiment structure; optionally face-fusing two of said woven condiment structures, or a woven condiment structure with a second condiment structure, using an edible bonding layer sheet there-between to form a woven face-fused combination condiment structure.

* * * * *